US011020793B2

(12) United States Patent
De Monte et al.

(10) Patent No.: US 11,020,793 B2
(45) Date of Patent: Jun. 1, 2021

(54) MEASURING METHOD, SYSTEM AND SENSOR FOR A CONTINUOUS CASTING MACHINE

(71) Applicant: ERGOLINES LAB S.R.L., Trieste (IT)

(72) Inventors: Stefano De Monte, Trieste (IT); Stefano Spagnul, Trieste (IT); Isabella Mazza, Trieste (IT)

(*) Notice: Subject to any disclaimer, the term of this patent is extended or adjusted under 35 U.S.C. 154(b) by 571 days.

(21) Appl. No.: 15/676,156

(22) Filed: Aug. 14, 2017

(65) Prior Publication Data

US 2018/0021849 A1 Jan. 25, 2018

Related U.S. Application Data

(63) Continuation-in-part of application No. PCT/EP2016/000280, filed on Feb. 18, 2016.

(30) Foreign Application Priority Data

Feb. 20, 2015 (IT) .......................... UD2015A000020

(51) Int. Cl.
*B22D 2/00* (2006.01)
*B22D 11/18* (2006.01)
(Continued)

(52) U.S. Cl.
CPC ............ *B22D 2/003* (2013.01); *B22D 2/006* (2013.01); *B22D 11/00* (2013.01); *B22D 11/182* (2013.01);
(Continued)

(58) Field of Classification Search
CPC .... B22D 11/181; B22D 11/186; B22D 2/003; B22D 11/182; B22D 11/205
See application file for complete search history.

(56) References Cited

U.S. PATENT DOCUMENTS 3,456,715 A 7/1969 Freedman et al.
4,320,659 A 3/1982 Lynnworth et al.
(Continued)

FOREIGN PATENT DOCUMENTS

CA 2310764 A1 12/2000
EP 2409795 A1 * 1/2012 ............. G01K 13/00
(Continued)

OTHER PUBLICATIONS

Machine Translation of Kodama et al (JP H10-185654 A, Jul. 14, 1988). (Year: 1988).*

(Continued)

*Primary Examiner* — Kevin E Yoon
*Assistant Examiner* — Jacky Yuen
(74) *Attorney, Agent, or Firm* — Egbert Law Offices, PLLC

(57) ABSTRACT

A system for detection of the level of a liquid metal within a crystallizer of a mold has a detection system. The detection system is based on a transmission of at least one signal transmitted toward a crystallizer having the liquid metal therein and a reception of a reflection of the transmitted signal. A first ultrasonic element transmits a ultrasonic elastic wave and a second ultrasonic element receives the ultrasonic elastic wave. A processor measures a time elapsed between transmission and reception and correlates the elapsed time relative to the level of liquid metal in the crystallizer.

19 Claims, 11 Drawing Sheets

(51) Int. Cl.
*B22D 11/20* (2006.01)
*G01F 23/296* (2006.01)
*G01K 13/02* (2021.01)
*B22D 11/00* (2006.01)

(52) U.S. Cl.
CPC .......... *B22D 11/186* (2013.01); *B22D 11/202* (2013.01); *B22D 11/205* (2013.01); *G01F 23/2961* (2013.01); *G01F 23/2968* (2013.01); *G01K 13/02* (2013.01); *G01F 23/2962* (2013.01); *G01K 13/026* (2021.01)

(56) References Cited

U.S. PATENT DOCUMENTS

| | | | |
|---|---|---|---|
| 6,631,639 | B1 | 10/2003 | Dam et al. |
| 2011/0120231 | A1* | 5/2011 | Berger .................... G01F 1/662 |
| | | | 73/861.18 |
| 2012/0085164 | A1 | 4/2012 | Roehrig et al. |

FOREIGN PATENT DOCUMENTS

| | | |
|---|---|---|
| FR | 2323988 A1 | 4/1977 |
| JP | H10185654 A | 7/1998 |
| WO | 2005/037461 A1 | 4/2005 |

OTHER PUBLICATIONS

Acoustic Properties of Plastics, Onda Corporation, http://www.ondacorp.com/images/Plastics.pdf, Apr. 11, 2003 (accessed Dec. 23, 2019). (Year: 2003).*

* cited by examiner

MEASURING METHOD, SYSTEM AND SENSOR FOR A CONTINUOUS CASTING MACHINE

CROSS-REFERENCE TO RELATED APPLICATIONS

The present application is a continuation-in-part of International Application No. PCT/EP2016000280, filed on Feb. 18, 2016, presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

FIELD OF THE INVENTION

The present invention relates to a casting mould comprising a measuring system for measuring at least one physical quantity selected from the temperature of at least one portion of a mould for the casting of a molten metal and the position of the level of said molten metal within the mould. The present invention also relates to a continuous casting machine using said system.

Definitions

In the present description and in the appended claims the following terms must be understood according to the definitions given in the following.

The terms "upper", "on the upper part", "lower", "on the lower part" must be understood as referring to the direction of gravity.

In the present invention by the term "liquid metal" one will mean to include both pure metals and metal alloys in the liquid state which are at a temperature at least equal to that of their melting point.

In the present invention by the term "ultrasound" one will mean an elastic wave having a frequency higher than 0.5 MHz.

PRIOR ART

In the field of the production of steel or, in general, of metals and metal alloys, an essential role is played by continuous casting machines. Continuous casting is a production process which allows to produce steelwork semi-finished products called billets, blooms, slabs depending on their size and shape. The production of the semi-finished products occurs starting from the metal or metal alloy in the molten state which are cast in a mould cooled by means of a cooling fluid which flows according to a direction in counter-current with respect to the direction of advancement of the metal semi-finished product which is progressively formed within the volume of the mould. The mould is placed according to an essentially vertical arrangement. The mould is open at its lower end from which the semi-finished product being formed comes out. The mould is open at its upper end from which the liquid metal enters, which progressively begins to solidify within the mould to be then extracted from the lower end of the mould. The process is stationary, meaning that in the unit of time an amount of metal at least partially solidified comes out from the lower part of the mould, which corresponds to the amount of liquid metal which enters the mould on its upper part. Once the casting process in the continuous casting machine has been started, the level of the liquid metal within the mould must be kept always constant, that is to say, the position of the free surface of the liquid metal, that is to say, the position of the so-called meniscus, with respect to the internal wall of the mould must be kept constant in time during the process.

In order to keep the level of the liquid metal constant, that is to say, to keep the position of the meniscus constant, it is possible to act by increasing or reducing the speed of extraction of the semi-finished material being formed within the mould or it is possible to act by increasing or reducing the flow of liquid metal which enters the mould from its upper end.

In order to obtain a measurement of the position of the meniscus, in such a way as to control the speed of extraction or in such a way as to control the flow of liquid metal which penetrates the mould, two types of sensors are currently available on the market.

The first type of sensors for measuring the level of liquid metal in the mould consists of the radioactive sensors. The radioactive sensors comprise a radioactive source placed on a first side of the mould and a scintillator placed on a second side of the mould opposite with respect to the first side. The scintillator picks up an amount of radiations which depends on the position of the meniscus of the liquid metal which is between the radioactive source and the scintillator itself and from such measurement it is possible to obtain the measurement of the position of the meniscus. Therefore, the radioactive sensors make a sort of radiograph of the mould in correspondence of the meniscus of the steel and allow to determine with great precision the position of the meniscus itself with a degree of accuracy of about 1 mm.

The second type of sensors for measuring the level of liquid metal in the mould consists of the electromagnetic sensors. The electromagnetic sensors are based on the emission of an electromagnetic field in correspondence of the wall of the crystallizer containing the liquid metal. The generated electromagnetic field produces on the crystallizer some parasitic currents whose generated electromagnetic field is in its turn picked up by reception coils of the sensor itself. The parasitic currents depend on the conductivity of the crystallizer in the region of generation of the parasitic currents themselves and the conductivity in its turn depends on the temperature of the crystallizer in the region of generation of the parasitic currents and, as a consequence, it indirectly depends on the position of the meniscus of the liquid metal whose heat is absorbed by the cooling fluid across the crystallizer.

Furthermore, systems for measuring the temperature of the wall of the crystallizer are also known, which are based on the insertion of thermocouples into the thickness of the crystallizer. Measuring the temperature of the wall of the crystallizer in different points allows to obtain a mapping of the temperature of the wall of the crystallizer.

By monitoring the temperature of the wall of the crystallizer, it is possible to obtain warnings for the prevention of undesired phenomena such as the breakout of the skin of the partially solidified metal which is extracted from the mould or such as the localized sticking of the liquid metal on the wall of the crystallizer. Starting from the thermal mapping of the wall of the crystallizer, the identification of the described phenomena occurs according to algorithms, which are considered as known for the purposes of the present invention.

Patent Application JP H10 185654 describes a method for detecting the level of liquid inside a furnace, wherein said level can be stably detected over a long period of time without being influenced by the gain fluctuations of a transmitting and receiving system in which the fluctuations are caused by the contact force of an elastic wave transmitting element and receiving element to the furnace wall. An elastic wave transmitting element and an elastic wave receiving element are set on a furnace outer wall whose circumference is covered with a refractory, and an elastic wave is emitted from the elastic wave transmitting element into a furnace to detect the liquid level of a furnace melted matter on the basis of the received signal obtained from the elastic wave receiving element by the emission of the elastic wave, the surface wave propagating the furnace outer wall surface and the reflected echo by the furnace inner wall are received by the elastic wave receiving element, the wave height of the reflected echo is corrected on the basis of the wave height of the surface wave, and the level is detected on the basis of the wave height of the corrected reflected echo.

U.S. Pat. No. 3,456,715 describes a system for detecting the level of a substance in a container, such as a reciprocating continuous casting mould, by transmitting acoustic energy through the container to generate a signal representative of the substance at a reference level. A second electrical signal is responsive to the reciprocation of the container representing its displacement from a reference position. The combination of the first and second signals gives an output signal indicative of the level of the substance. An electroacoustic transducer means is arranged to transmit acoustic energy through a coolant flowing continuously between the transducer means and the wall of a mould or vessel containing the material whose level is to be measured. When the level of a substance reaches the level at which the transducer is disposed, an electrical signal is developed which has a characteristic indicating the presence of the material at that level. In a preferred embodiment, the electroacoustic transducer means includes both a transmitter and a receiver, disposed at opposite sides of the vessel or mould, which together are operable to generate an electrical signal in response to the detection of acoustic energy transmitted through the space occupied by the material, that is to say, across the material itself. The transmission of the signal occurs according to an orthogonal direction with respect to the wall of the mould or container. In an alternative embodiment it is provided to install only one ultrasonic device which acts as a transmitter in some time periods and as a receiver in other time periods and also in this case the transmission of the signal occurs according to an orthogonal direction with respect to the wall of the mould or container so that the only one ultrasonic device is able to receive the echo of the transmitted signal along the same axial direction orthogonal with respect to the wall of the mould or container.

Patent Application CA 2 310 764 describes a method for continuous level measurement on containers, according to which a sequence of Lamb wave pulses is transmitted on the container wall by means of a Lamb wave excitor arranged on it and is received by a Lamb wave receiver which is arranged at a distance from the Lamb wave excitor on the container wall. The system determines the propagation time difference between the excitor and the receiver as the difference between the propagation time when the container is empty and the propagation time when in the container a certain level is present. From the difference between the propagation times one derives the position of the current level within the container which is directly proportional to the difference between the propagation times. Since there is a variation in the propagation time of the Lamb waves when a different material comes into contact with the wall of the container, the method allows for a continuous monitoring of the level within the containers.

U.S. Pat. No. 4,320,659 describes an ultrasonic system that measures either the impedance of a fluid or liquid level using moderately directional transverse-mode sound waves generated by a transducer and propagated in a homogeneous, flaw-free solid member. The transverse wave propagates in the solid along a zigzag path that reflects at a solid-fluid interface in at least two areas and at an angle of incidence that exceeds the first critical angle by at least five degrees and is less than the second critical angle by at least ten degrees. The attenuated amplitude of the wave due to acoustic coupling between the solid and the fluid measures the impedance or an impedance related parameter of the fluid. The system preferably includes a second acoustic path that serves as a reference to compensate for changes in parameters such as temperature, the nature of the fluid, the transducer, the transducer coupling, and residues or corrosion at the solid-fluid interface. In another form, the reference mechanism is a series of reflections from notches in the solid member. For liquid level measurement desensitized to variations in the liquid impedance, the solid is an elongated member that is oriented at an oblique angle, or is parallel to, the surface of the liquid. Other liquid level measurement systems utilize multiple receivers or reflectors located at the points of reflection of the zigzag wave.

Patent Application US 2012/085164 describes a mount and housing for fluid meter components, including transducers, which is directly coupled to fixation points on a pipe exterior circumference without external straps. The mount may be selectively coupled and decoupled from the pipe fixation points. One or more mounts and housings may be arrayed on a pipe exterior in modular fashion, for different metering applications. Similarly, the mount and housing interior optionally may be reconfigurable in modular fashion for orientation and alignment of one or a plurality of transducers or other components for different user applications, without the need for auxiliary alignment tools, templates, measuring instruments or other devices.

U.S. Pat. No. 6,631,639 describes a non-invasive system and method for measuring liquid level in a vessel utilizing a pair of ultrasonic transducers mounted spaced apart externally on the vessel wall. One of the transducers excites a single pulse of sonic energy that produces a flexural, or elastic, wave in the wall and the second transducer receives the flexural wave to produce an electrical signal waveform corresponding to the travel time of the flexural wave between the two transducers. The electrical waveform signals produced at different times are compared to determine if a phase delay exists between two waveform signals. The phase delay indicates that there has been a change in the liquid level condition in the vessel interior space between the two transducers. Measuring the phase delay, or time delay, between the flexural wave components produced at two different times is used to indicate presence or absence of the liquid at a point on the vessel or the height of the liquid in the vessel interior space.

Patent Application WO 2005/037461 describes a method for the identification of breakdown events in an ingot mould, so as to anticipate and avoid the possibility that, if damaged inside the ingot mould, the skin of the solidified outer layer of the molten steel bath causes leaked molten steel to smear the underlying rollers when the ingot comes out of the mould, thereby causing the entire plant to stop. A high-frequency mechanical oscillation is generated on the outer and inner surface of the ingot mould, so as to give rise to so-called surface or Rayleigh-type waves, and it is analysed how such oscillation is absorbed by the surface of the material being in permanent contact with the ingot mould. Should the size or extension of this surface vary following a breakdown of the solidified outer layer, there occurs an abrupt increase in the contact with the copper walls and, as a result, an immediate variation of the acoustical impedance of the copper surface of the ingot mould.

Patent Application FR 2 323 988 describes a system for measuring the level in a mould of a continuous casting machine in which pulses of ultrasonic waves are propagated exclusively along the internal surface of the wall of the container towards the liquid and are partially reflected by the discontinuity represented by the liquid in contact with the surface of the wall. The reflected wave is detected and the time gap which separates the generated pulse from the detected ultrasonic wave is measured. The value of the gap represents the position of the discontinuity in respect of a pre-set reference level for the liquid.

Problems of the Prior Art

The radioactive sensors have remarkable problems in relation to the handling of the radioactive source and of the materials which are exposed to the radioactive source itself for a long period. In fact, when the radioactive source runs out, it is necessary to adopt very strict safety procedures for its replacement to prevent the operators from being exposed to radiations. Furthermore, there are problems of disposal of the exhausted radioactive source, which must be carried out by specialized firms. Moreover, any possible loss of a radioactive source, which is a not too remote event in the operations of replacement of the exhausted sources, implies the immediate seizure of the plant, with the consequent stop of production and huge economic damage.

The electromagnetic sensors, although being a safer alternative from the point of view of handling with respect to radioactive sensors, are less widespread because they are less accurate, slower in response and usable only for moulds having a not too great thickness of the crystallizer, that is to say, generally of less than 15 mm.

In fact, due to the shielding action of the metal mould, the parasitic currents induced by the electromagnetic sensor affect only a layer of about 1 mm of the total thickness of the crystallizer. Said zone affected by the parasitic currents is on the opposite side of the crystallizer with respect to the side on which there is the molten metal which is cast. If the thickness of the crystallizer is great, that is to say, greater than 15 mm, the measurement of the electromagnetic sensor is affected by a delay due to the time necessary for the temperature of the crystallizer to change in correspondence of the zone affected by the parasitic currents, that is to say, the external side of the crystallizer, following the change in the position of the meniscus in correspondence of the opposite side of the crystallizer, that is to say, on the internal side of the crystallizer. In fact, a variation in the position of the meniscus of the liquid metal on the internal side of the crystallizer produces a temperature change which propagates within the thickness of the crystallizer until reaching the external side of the crystallizer, near which the electromagnetic sensor is placed. The temperature change in the metal material of which the crystallizer is made, that is to say, the difference in temperature between the region of the wall of the crystallizer below the level of the cast liquid metal and the region just above where there is no liquid metal in contact with the crystallizer is maximum on the internal side of the mould where there is the cast liquid metal while it becomes progressively less marked as one approaches the external side of the crystallizer. Furthermore, if the mould is very thick, the difference in temperature in the first millimetre of thickness of the external side of the crystallizer where there are the induced parasitic currents is so weak as to not be detectable with an electromagnetic sensor. These sensors are thus used for moulds not thicker than 15 mm. This limitation excludes their use in the moulds for large formats, which reach copper thicknesses up to 40 mm, thus making the radioactive sensor the only technology suitable for the control of level in large formats.

The mapping of the temperature of the mould by means of thermocouples has some drawbacks too, because the thermocouples must be inserted into specific cavities obtained in the thickness of the crystallizer. This method can be applied only in case of great thicknesses of the crystallizer because the insertion of thermocouples on crystallizers having small thicknesses of the order of 15 mm would weaken the structure of the crystallizer and may also locally jeopardize the efficiency of the cooling of the liquid metal contained in the crystallizer.

Aim of the Invention

The aim of the present invention is to provide a measuring method, a measuring system and a measuring sensor for measuring at least one physical quantity in a mould which allow for accurate and precise measurements.

A further aim of the present invention is to provide a mould provided with said measuring system.

Concept of the Invention

The aim is achieved by the characteristics of the main claim. The sub-claims represent advantageous solutions.

Advantageous Effects of the Invention

The solution according to the present invention, by the considerable creative contribution the effect of which constitutes an immediate and important technical progress, presents various advantages.

The sensor and the method according to the invention do not resort to radioactive sources, but are based on materials and methods which are not dangerous for health and which do not have disposal problems.

The solution according to the present invention allows to obtain precise measurements also in case of great thicknesses of the crystallizer, that is to say, greater than 15 mm.

The solution according to the present invention allows to obtain measurements of the temperature of the crystallizer in different points without the need to insert thermocouples into the thickness of the crystallizer enabling such detection also on crystallizers of small thickness, for example of less than 20 mm.

The solution according to the present invention allows to operate with a high level of sensitivity, precision and reliability.

The solution according to the present invention allows to have low installation and management costs of the measuring system.

DESCRIPTION OF THE DRAWINGS

In the following a solution is described with reference to the enclosed drawings, which are to be considered as a non-exhaustive example of the present invention in which.

DESCRIPTION OF THE INVENTION

Figure 1:
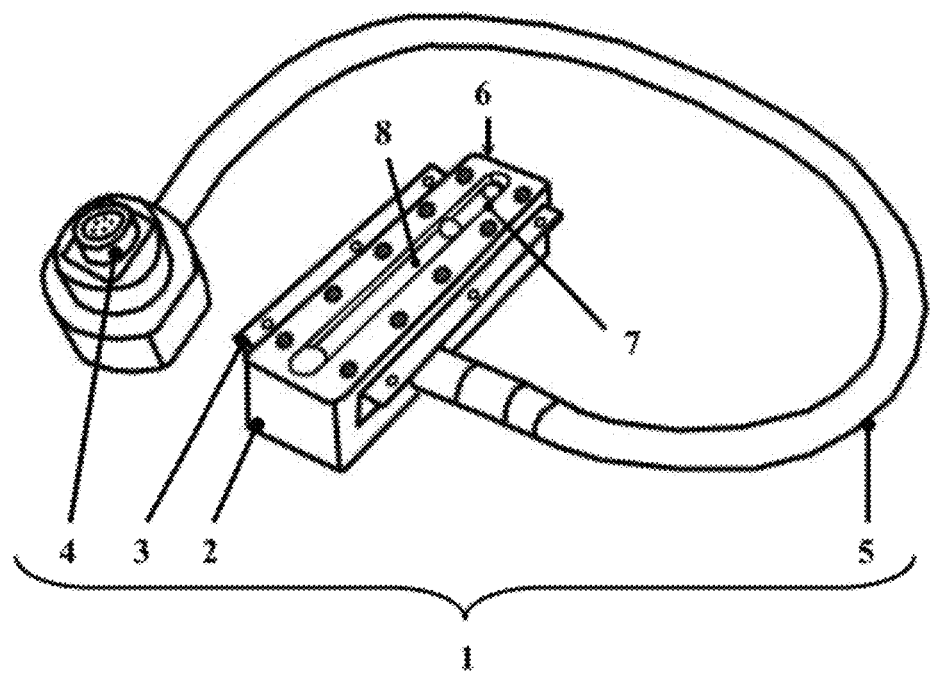
FIG. 1 shows a first embodiment of the present invention and in particular it shows a sensor for measuring the level of a liquid metal within a casting mould made in accordance with the present invention.
Figure 2:
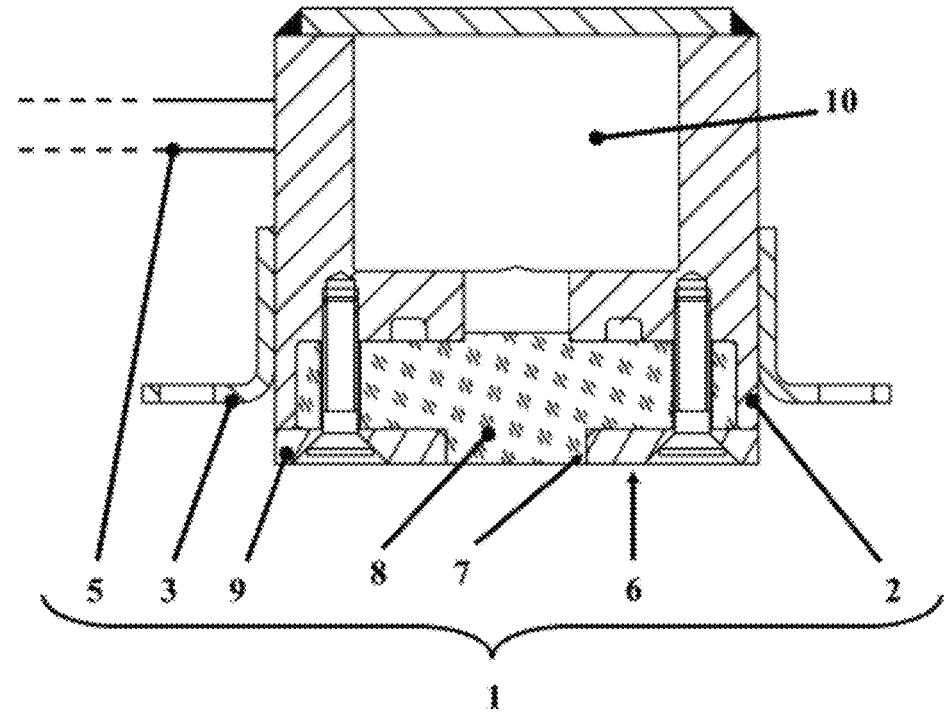
FIG. 2 shows a sectional view of the sensor of FIG. 1.
Figure 3:
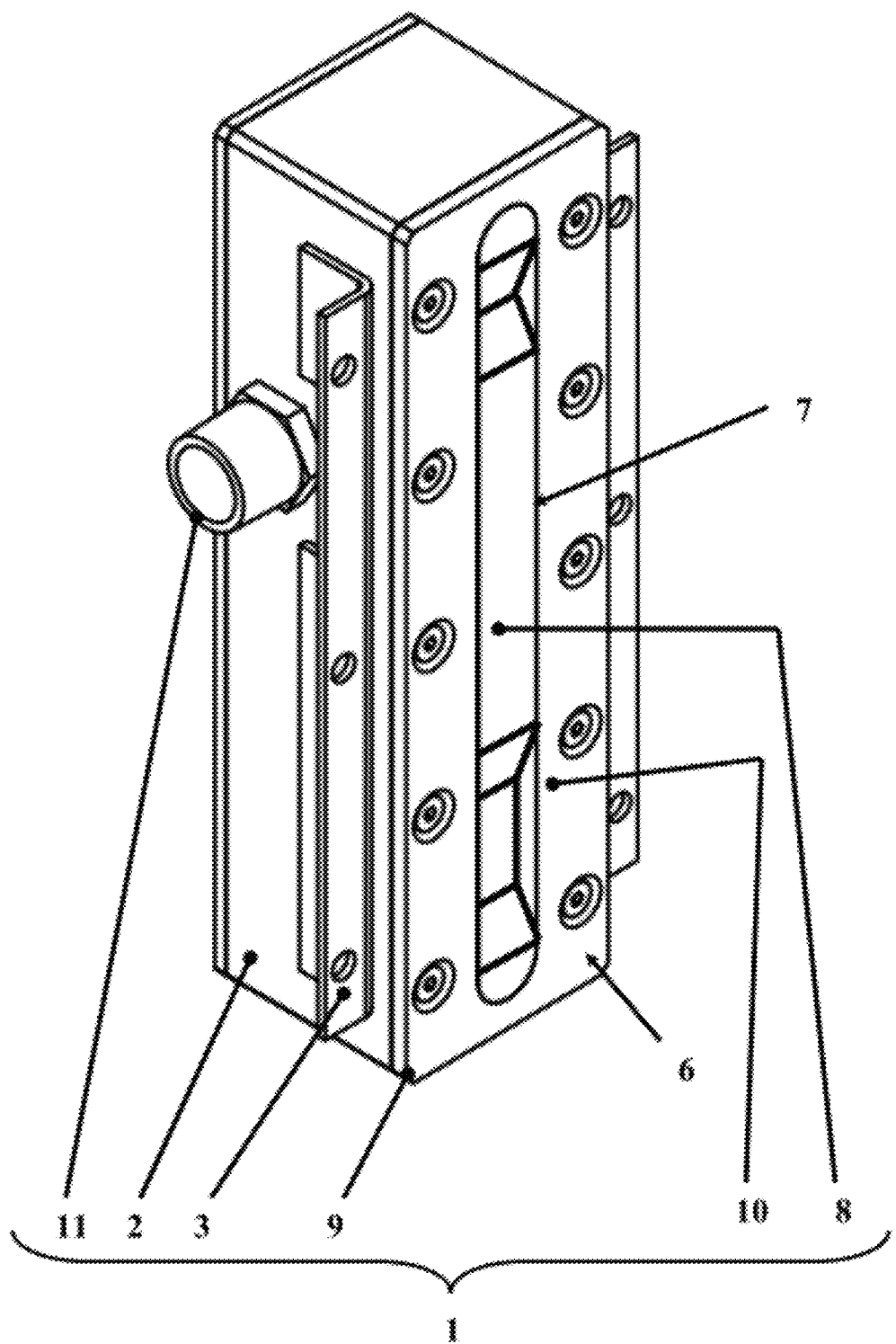
FIG. 3 shows a perspective view of the sensor of FIG. 1.
Figure 4:
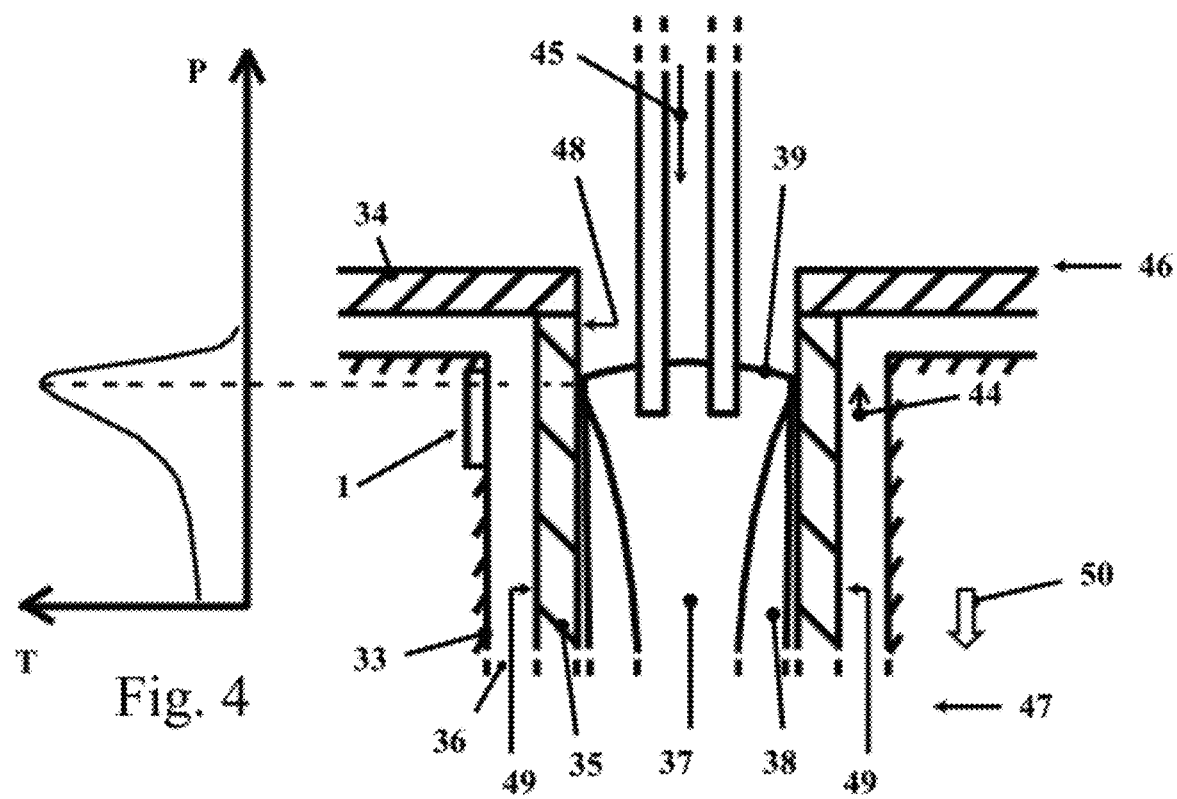
FIG. 4 schematically shows a first possible type of installation of the sensor of FIG. 1 in a mould.
Figure 5:
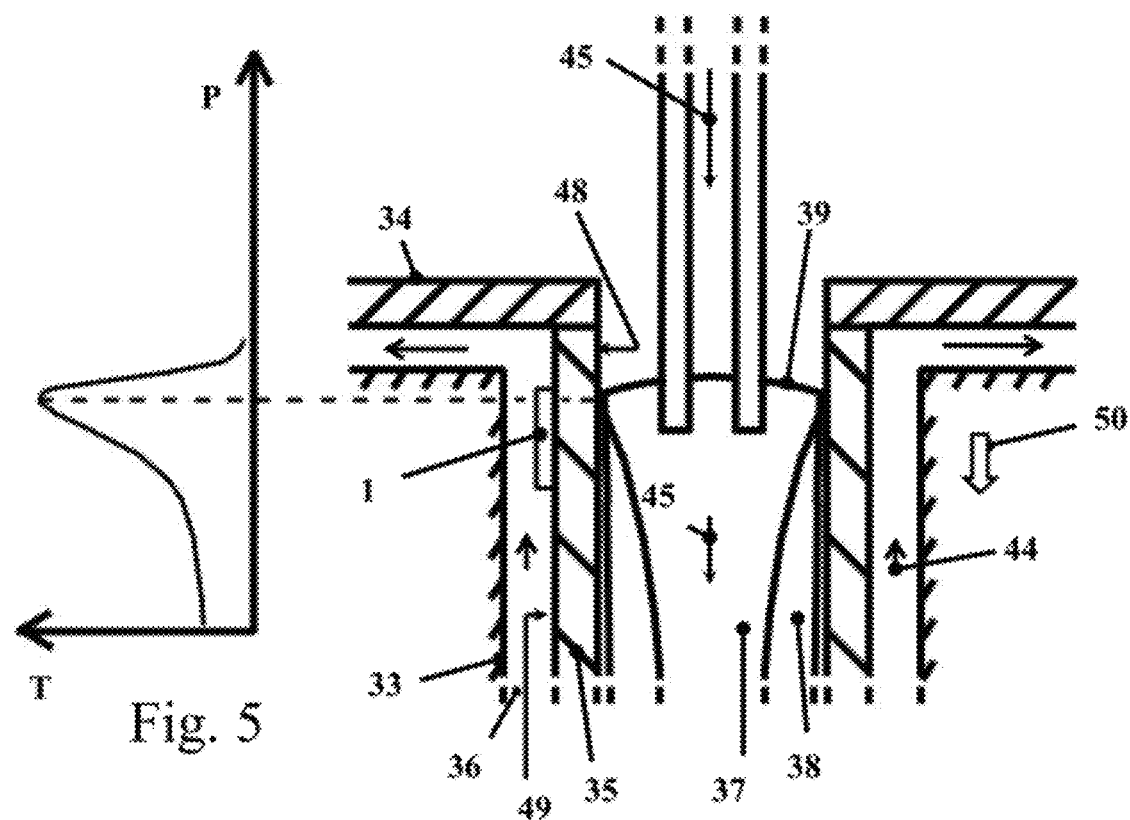
FIG. 5 schematically shows a second possible type of installation of the sensor of FIG. 1 in a mould.
Figure 6:
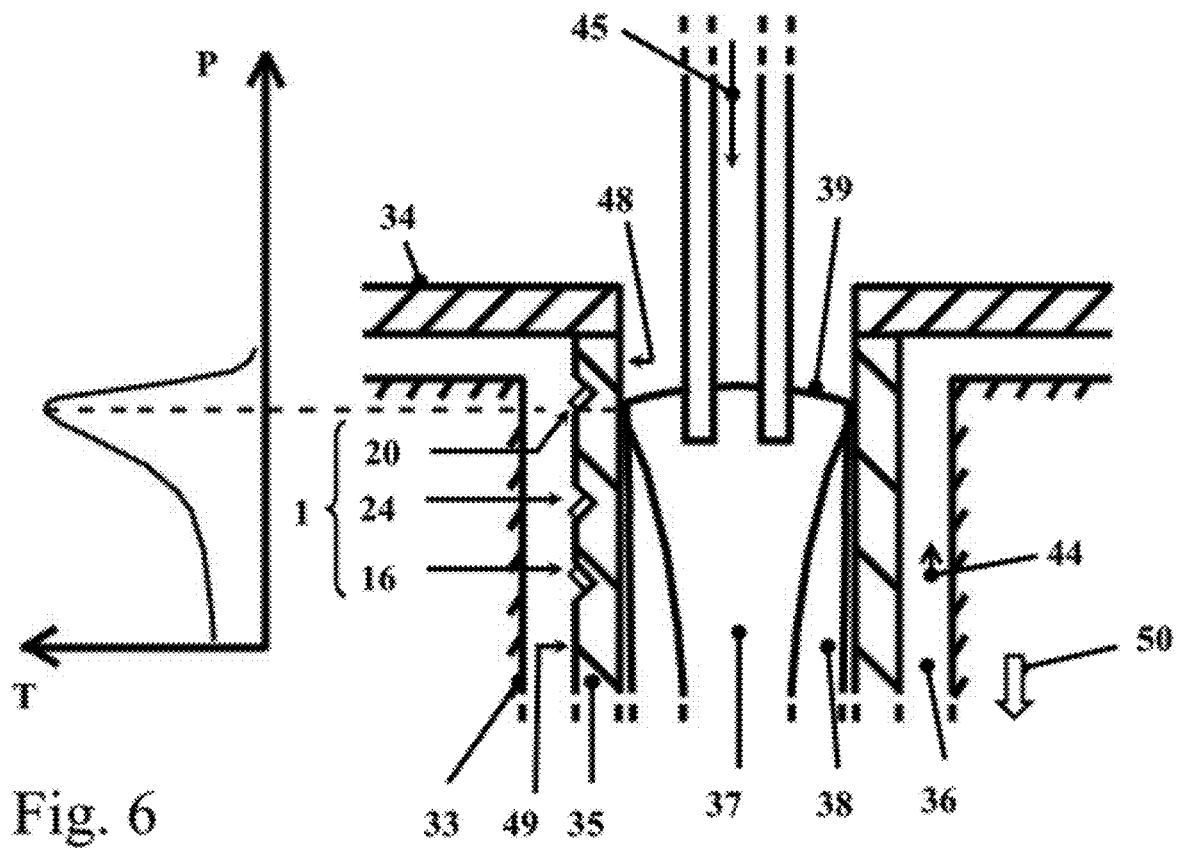
FIG. 6 schematically shows a first possible type of application of the method according to the invention in respect of the measurement of the level of liquid metal in a mould or in respect of the measurement of the temperature of the wall of the mould in different points of the mould.
Figure 7:
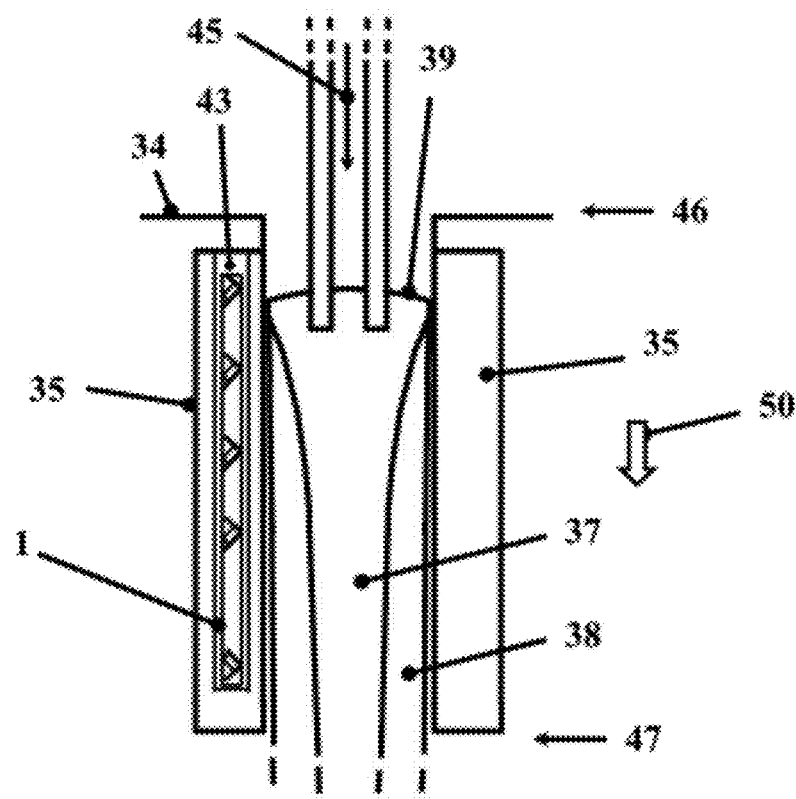
FIG. 7 schematically shows a second possible type of application of the method according to the invention in respect of the measurement of the level of liquid metal in a mould or in respect of the measurement of the temperature of the wall of the mould in different points of the mould.
Figure 8:
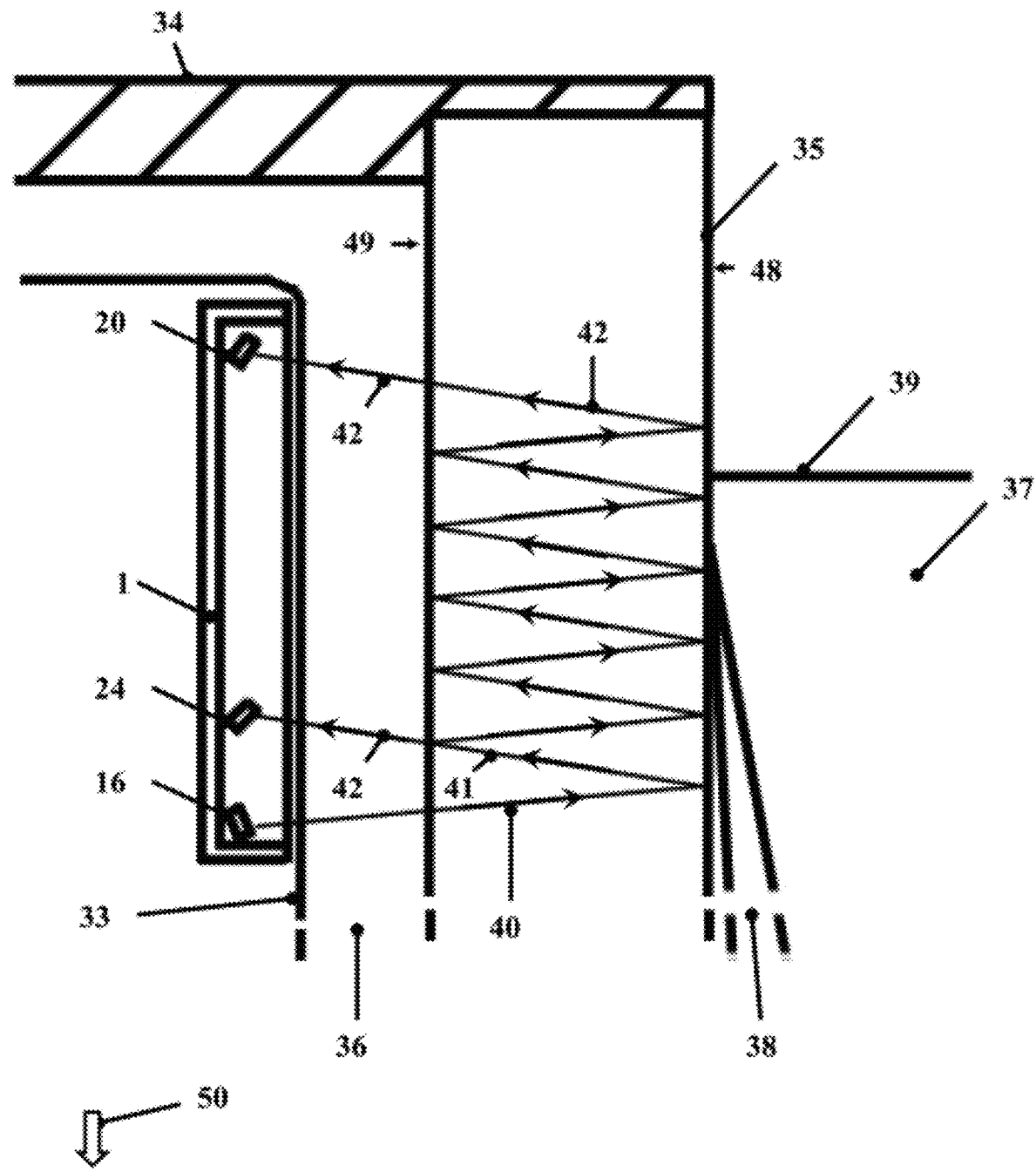
FIG. 8 schematically shows the principle of operation of the sensor according to the invention or of the method according to the invention in respect of a possible embodiment of the sensor according to the invention.
Figure 9:
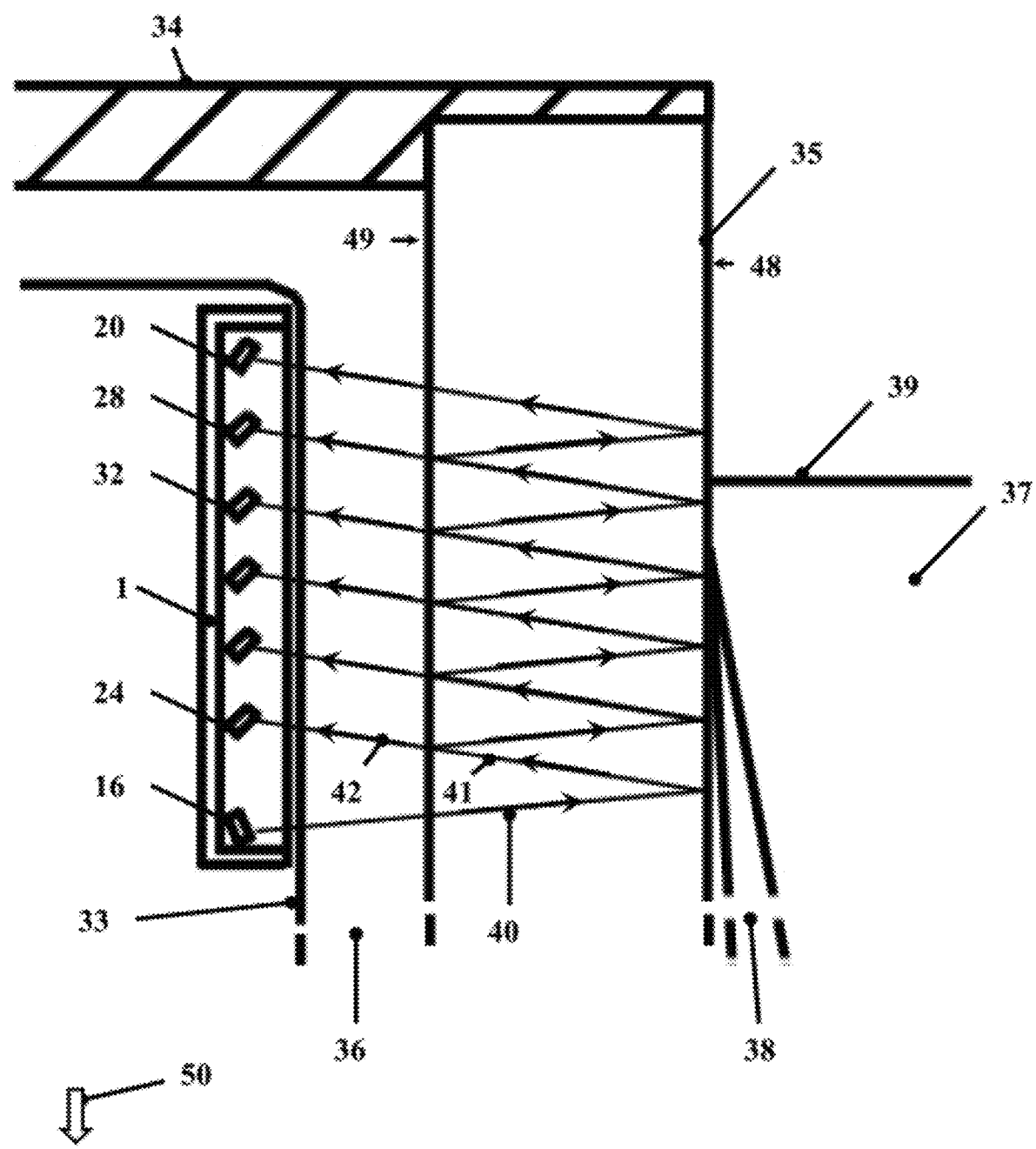
FIG. 9 schematically shows the principle of operation of the sensor according to the invention or of the method according to the invention in respect of a possible different embodiment of the sensor according to the invention.
Figure 10:
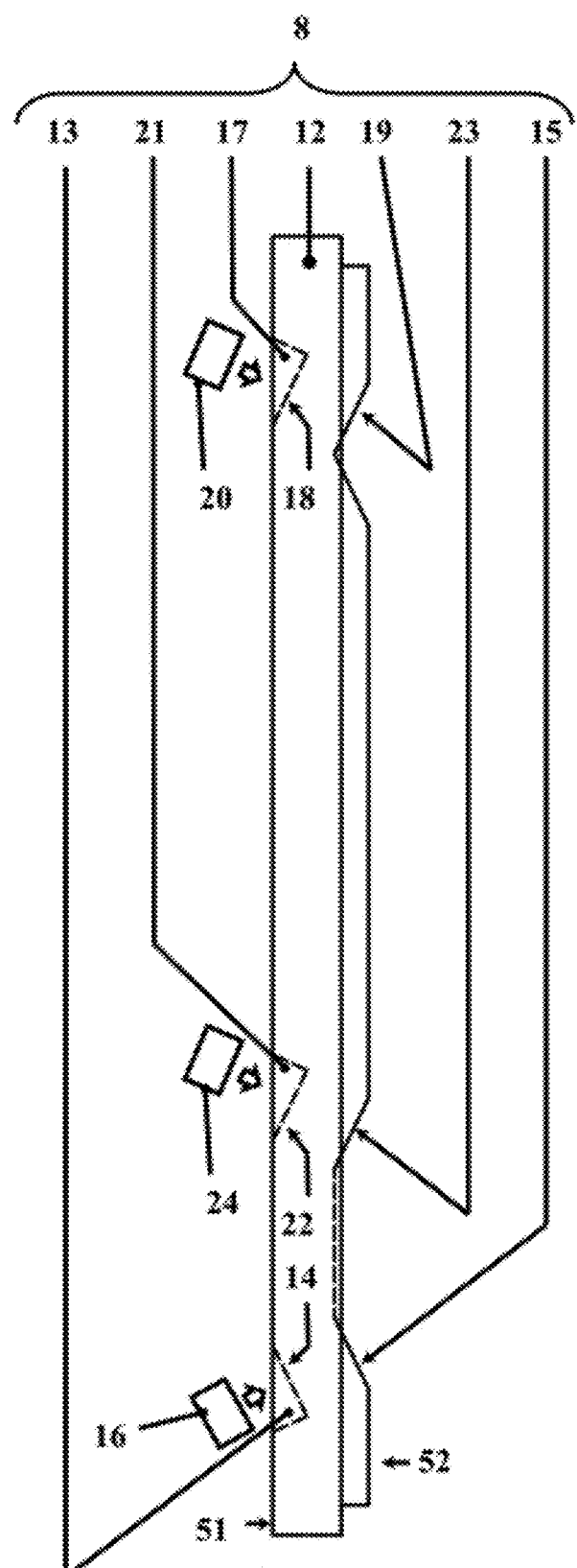
FIG. 10 schematically shows a side sectional view of a first embodiment of a portion of the sensor according to the invention illustrating the mounting of the measuring elements.
Figure 11:
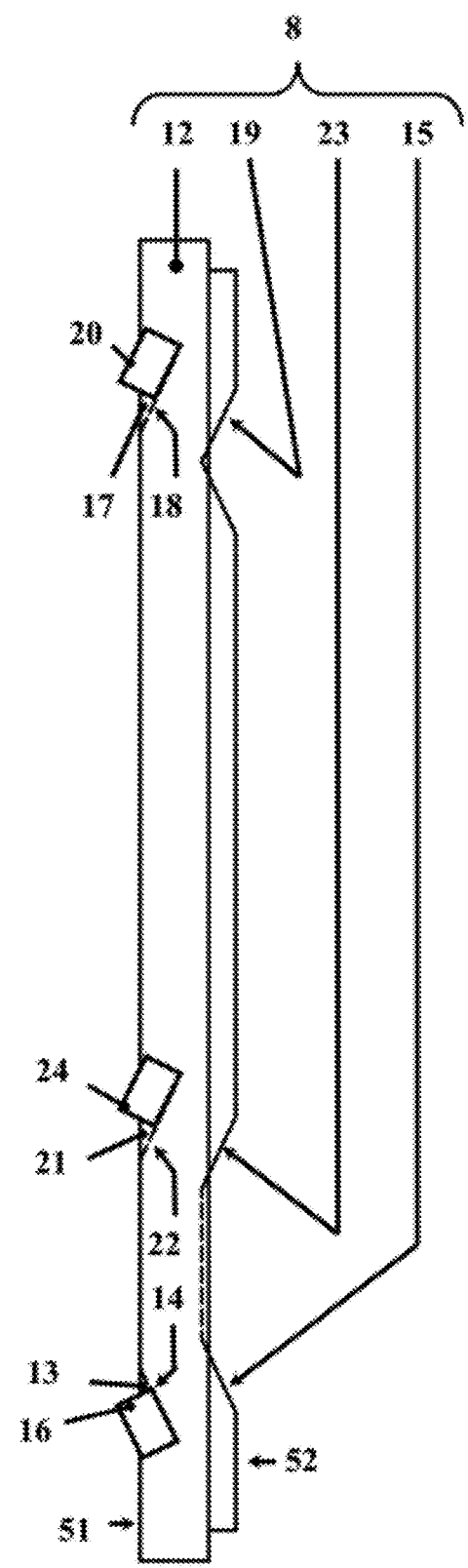
FIG. 11 shows the portion of the sensor of FIG. 10 with the measuring elements mounted.
Figure 12:
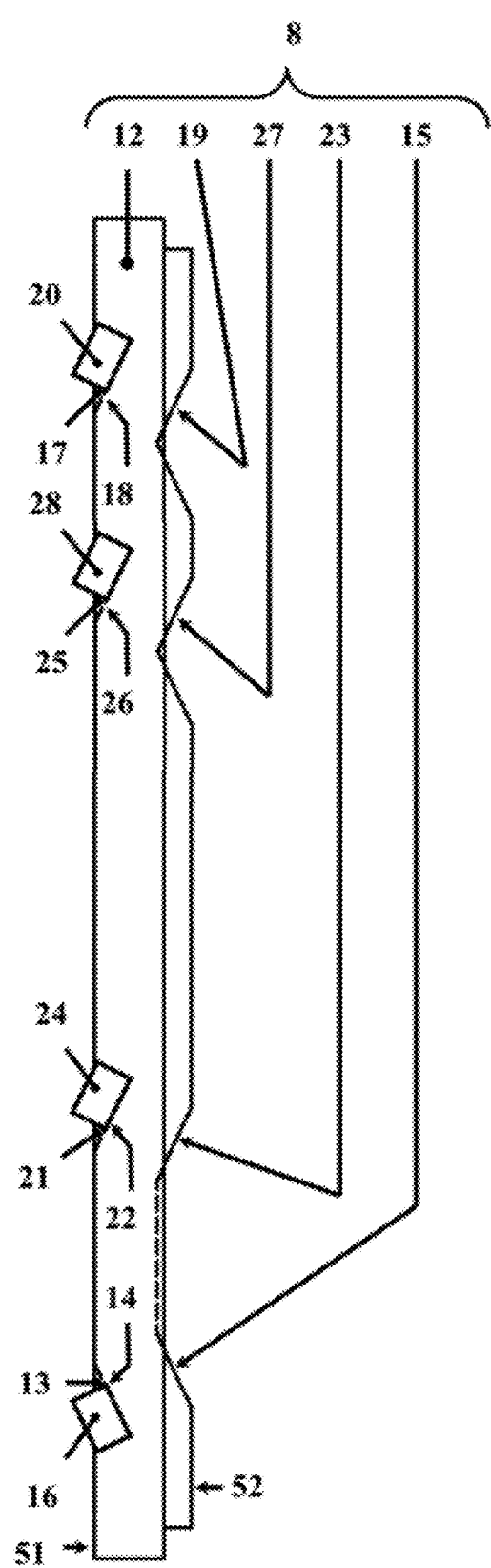
FIG. 12 schematically shows a side sectional view of a second embodiment of a portion of the sensor according to the invention with the measuring elements mounted.
Figure 13:
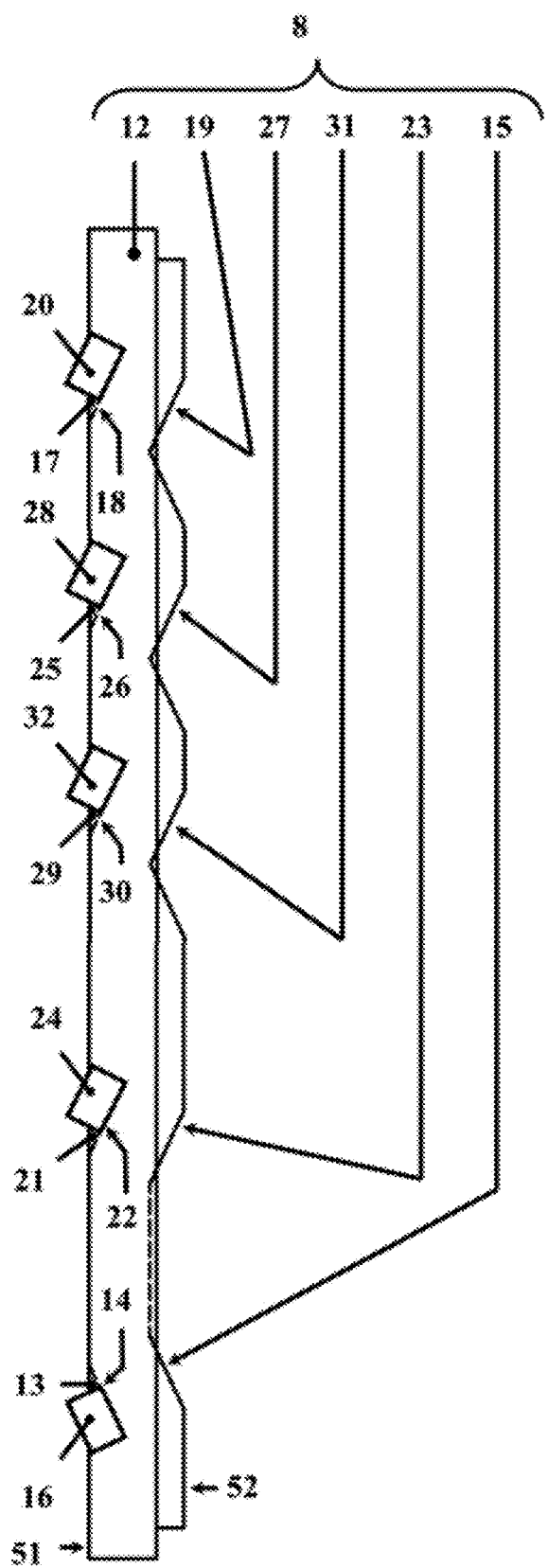
FIG. 13 schematically shows a side sectional view of a third embodiment of a portion of the sensor according to the invention with the measuring elements mounted.

As previously explained, with reference to the figures (FIG. 4, FIG. 5, FIG. 6, FIG. 7) the production of steel or, in general, of metals and metal alloys, occurs by means of continuous casting machines. Continuous casting is a production process which allows to produce steelwork semi-finished products called billets, blooms, slabs depending on their size and shape. The production of the semi-finished products occurs starting from the metal or metal alloy in the molten state which are cast in a mould (34). The mould (34) is placed according to an essentially vertical arrangement, although solutions in which the mould is installed in an inclined position are also known, which however have to be considered as solutions included in the scope of the present invention. The mould (34) is open (FIG. 4, FIG. 5, FIG. 6, FIG. 7) at its lower end (47) from which the semi-finished product being formed comes out. The mould is open at its upper end (46) from which the liquid metal enters, which progressively begins to solidify within the mould to be then extracted from the lower end of the mould. The terms "upper" and "lower" must be understood as referring to the direction of gravity. The process is stationary, meaning that in the unit of time an amount of metal at least partially solidified comes out from the lower part of the mould, which corresponds to the amount of liquid metal which enters the mould on its upper part. Once the casting process in the continuous casting machine has been started, the level (39) of the liquid metal (37) within the mould (34) must be kept always constant, that is to say, the position of the free surface of the liquid metal (37), that is to say, the position of the so-called meniscus, with respect to the internal wall of the mould (34) must be kept constant in time during the process. The mould (34) comprises a crystallizer (35) which is generally made of copper, although the present invention is also applicable in the case of crystallizers (35) made of metal materials other than copper, such as metal alloys. The crystallizer (35) is cooled by means of a flow of cooling fluid (44), usually water, which flows according to (FIG. 5) a direction of the flow of fluid (44) which is in counter-current with respect to the direction of the flow of the liquid metal (45) which is cast in the mould (34). When the cast liquid metal crosses the crystallizer (35), it progressively solidifies while it advances from the upper end (46) towards the lower end (47) of the mould (34). When the semi-finished product being formed comes out from the lower end (47) of the mould (34), it is not completely solidified but has a perimeter shell of the same shape as the crystallizer (35) which is solidified and which is called skin (38). Inside the skin (38) the semi-finished product being formed still contains a central core consisting of metal in the liquid state, which solidifies in the lower part of the continuous casting machine as it advances towards following processing devices, such as straightening rolls, cutting-to-size units, etc.

The cooling of the crystallizer (35) can occur in different ways. In a first solution (FIG. 4, FIG. 5, FIG. 6), suitable for crystallizers (35) for billets or blooms having smaller sizes with respect to the maximum castable sizes, the cooling occurs by addressing the previously described flow of cooling fluid (44) onto the external wall (49) of the crystallizer (35) within a perimetrically external spacing (36) which surrounds the crystallizer and which is delimited by a conveyor (33). In a second solution (FIG. 7), suitable for crystallizers (35) for blooms having large sizes with respect to the maximum castable sizes or suitable for the casting of slabs, the cooling occurs by addressing the previously described flow of cooling fluid within interspaces of the crystallizer (35) itself or in interspaces obtained on coupling surfaces of assembly elements of the crystallizer.

In order to keep the level (39) of the liquid metal (37) constant, that is to say, to keep the position of the meniscus constant, it is possible to act by increasing or reducing the extraction speed of the semi-finished material being formed within the mould (34) or it is possible to act by increasing or reducing the flow of liquid metal (37) which enters the mould (34) from its upper end (46).

Therefore, it is important to obtain a measurement of the position of the meniscus, that is to say, of the position of the level (39) of the liquid metal with respect to the essentially vertical or inclined extension of the mould (34) in such a way as to control the extraction speed or in such a way as to control the flow of liquid metal (37) which enters the mould (34).

Furthermore, it is also important to obtain measurements of the temperature of the internal wall (48) of the crystallizer (35) because by monitoring the temperature of the internal wall (48) of the crystallizer (35) in different points it is possible to obtain some warnings for the prevention of undesired phenomena such as the breakout of the skin (38) of the partially solidified metal which is extracted from the mould or such as the localized sticking of the liquid metal on the internal wall (48) of the crystallizer (35). Starting from the thermal mapping of the internal wall (48) of the crystallizer (35) the identification of the described phenomena occurs according to algorithms, which are considered as known for the purposes of the present invention.

The present invention is based on the physical principle of transmission (FIG. 4, FIG. 5, FIG. 6, FIG. 7, FIG. 8, FIG. 9, FIG. 15, FIG. 16, FIG. 17, FIG. 18, FIG. 19) of ultrasounds in the materials of which the mould (34) is made, in the materials present in the mould as well as in the materials of which the sensor or the detection system (1) according to the invention is made.

The sensor or detection system (1) and the method according to the invention exploit the effect that the liquid metal (37) has on the crystallizer (35) of the mould (34). In fact, the cast liquid metal (37) has a temperature equal to the melting temperature of the metal itself. The casting temperature varies depending on the type of metal or metal alloy which is cast. For example, for steels the casting temperature can be of the order of 1370-1530° C., for copper the casting temperature can be of the order of 1083° C. In the present invention by "liquid metal" one means to include both pure metals and metal alloys in the liquid state, which are at a temperature at least equal to that of their melting point. When the liquid metal (37) is within the crystallizer (35), the temperature of the crystallizer (35) assumes a trend according to a curve similar to that represented laterally in FIG. 4, FIG. 5, FIG. 6. The temperature curve in the crystallizer (35) has a peak in correspondence of the position of the meniscus, that is to say, in correspondence of the level (39) of the liquid metal (37) in the mould (34), said level (39) being the quantity that one wishes to control in such a way as to keep it essentially constant in time during the casting. The constancy of the level (39) of the liquid metal (37) in the mould (34) is an essential condition to obtain the desired quality results in the semi-finished product, which is obtained from the continuous casting process. In fact, even small variations in the level (39) of the liquid metal (37) in the mould (34) may lead to the alteration of the properties of the semi-finished product.

To the alteration of the temperature of the crystallizer (35) according to the indicated trend also corresponds an alteration of the electrical properties of the metal of which the crystallizer (35) is made and an alteration of the elastic properties of the metal of which the crystallizer (35) is made. In particular in the crystallizer (35), due to the presence of the alteration of the temperature induced in correspondence of the level (39) or meniscus of the liquid metal (37), the speed of the sound, which is transmitted across the crystallizer, varies. On the basis of this principle the sensor or detection system (1) and the method according to the invention, on the basis of the correlation between the variation in the level (39) of the liquid metal (37) and the corresponding variation in the temperature in the crystallizer (35) in the region in correspondence of the level (39) of the liquid metal (37), allow to obtain both indications on the temperature of the crystallizer (35) in different zones of the latter and precise indications on the position of the level (39) of the liquid metal (37) within the crystallizer (35) in such a way as to be able to adjust its position to keep an essentially constant level.

The sensor or detection system (1) and the method according to the invention provide the application in correspondence of the crystallizer (35) of at least one first ultrasonic element (16) and at least one second ultrasonic element (20) of which one is an ultrasound transmitter having a given frequency range and one is an ultrasound receiver sensitive to a frequency range corresponding to the frequency range transmitted by the transmitter. In the present invention, in general, by "ultrasound" one will mean an elastic wave having a frequency higher than 0.5 MHz.

By the expression "application in correspondence of the crystallizer" one means to include:
- applications (FIG. 4, FIG. 8, FIG. 9, FIG. 17, FIG. 18, FIG. 19) of the ultrasonic elements (16, 20, 24, 28, 32) made in proximity to the crystallizer (35) but spaced with respect to it;
- applications (FIG. 5) of the ultrasonic elements (16, 20, 24, 28, 32) made in a condition of adhesion with the crystallizer (35);
- applications (FIG. 6) of the ultrasonic elements (16, 20, 24, 28, 32) made in a condition of adhesion with machined portions of a surface of the crystallizer (35);
- applications (FIG. 7) of the ultrasonic elements (16, 20, 24, 28, 32) made within the crystallizer (35), for example within a specific housing (43).

In particular (FIG. 8, FIG. 9, FIG. 17, FIG. 18, FIG. 19) the ultrasound transmitter generates a beam of elastic waves with ultrasonic frequencies which propagate along the crystallizer (35) in the region corresponding to the position of the level (39) of the molten metal contained in the mould, that is to say, in the region corresponding to the position of the meniscus of the molten metal. Since the presence of the alteration of the temperature profile of the crystallizer also alters the speed of the elastic waves, including the ultrasonic ones, by measuring the time interval that the supersonic waves take to travel across the crystallizer between the ultrasound transmitter and the ultrasound receiver it is possible to establish the position of the level (39) of the molten metal contained in the mould, as will be explained in the following of the present description. Upon variation in the position of the level (39) of the molten metal contained in the mould, said measured time interval varies and it is thus possible to obtain the position of the level (39) of the molten metal starting from a measurement of the propagation time, called "time of flight", of the elastic waves with ultrasonic frequencies.

Figure 17:
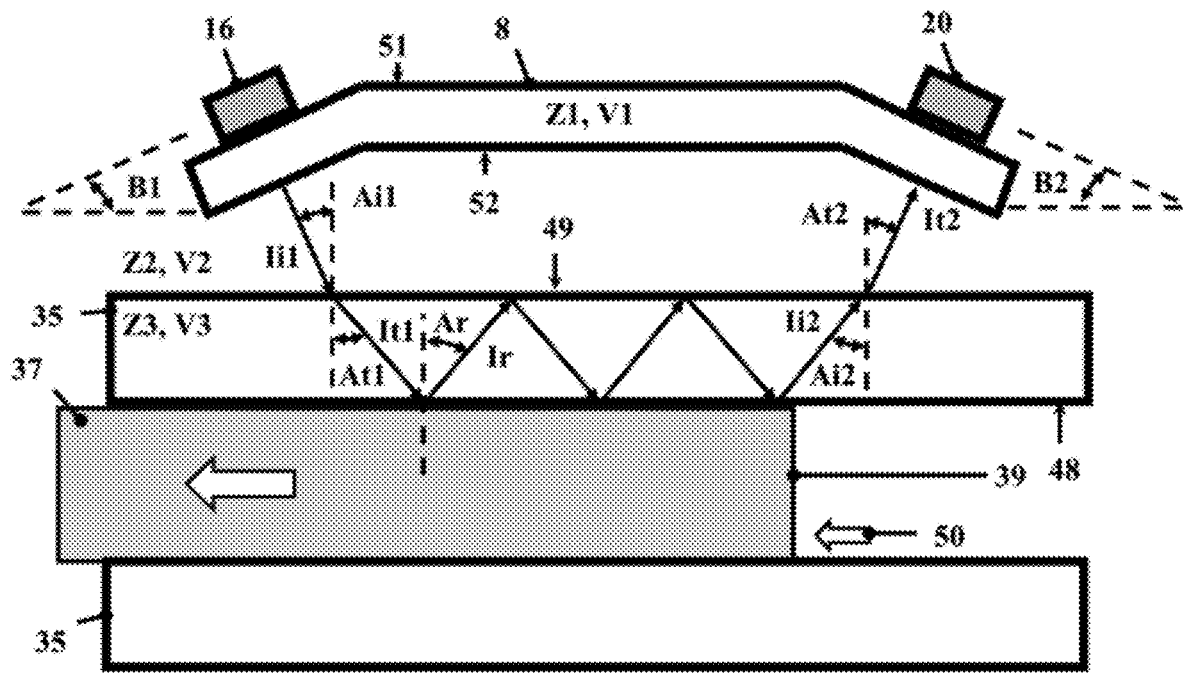
Figure 18:
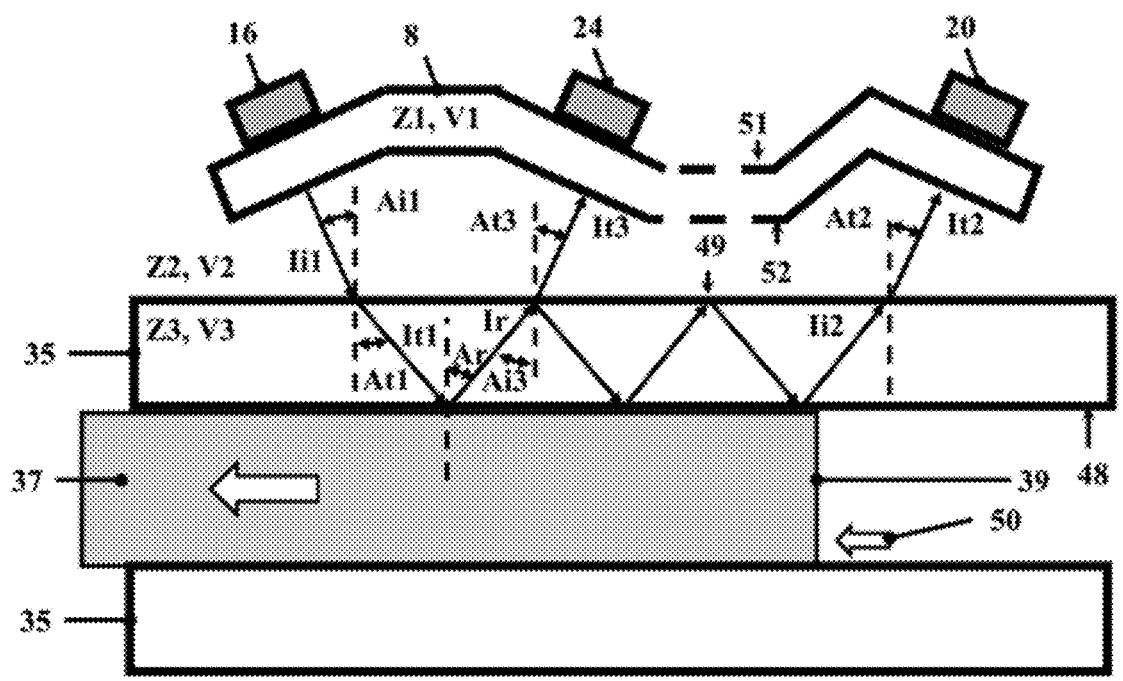
Figure 19:
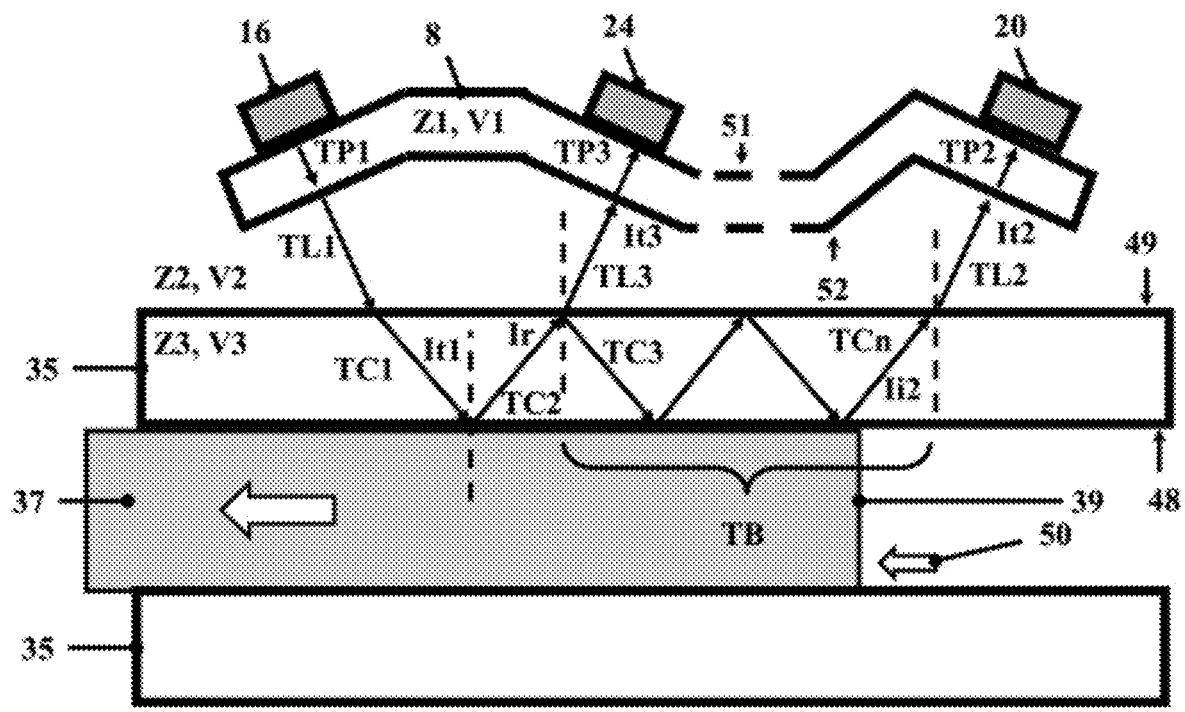

With reference to FIG. 17, FIG. 18, FIG. 19, they have been represented horizontally for illustrative convenience but it must be noted that the crystallizer (35) is placed essentially vertically according to the indicated direction of the force of gravity (50).

In one embodiment the ultrasonic elements (16, 20, 24, 28, 32) are piezoelectric ceramic transducers of which at least one ultrasound transmitter and at least one ultrasound receiver. Preferably, but not necessarily, the operating frequencies of the ultrasonic elastic waves used in the present invention are in a range from 1 to 10 MHz, preferred values being in a range from 1.5 to 5 MHz. Experimental tests have provided excellent results with operating frequencies of the ultrasonic elastic waves approximately of 2 MHz.

Figure 14:
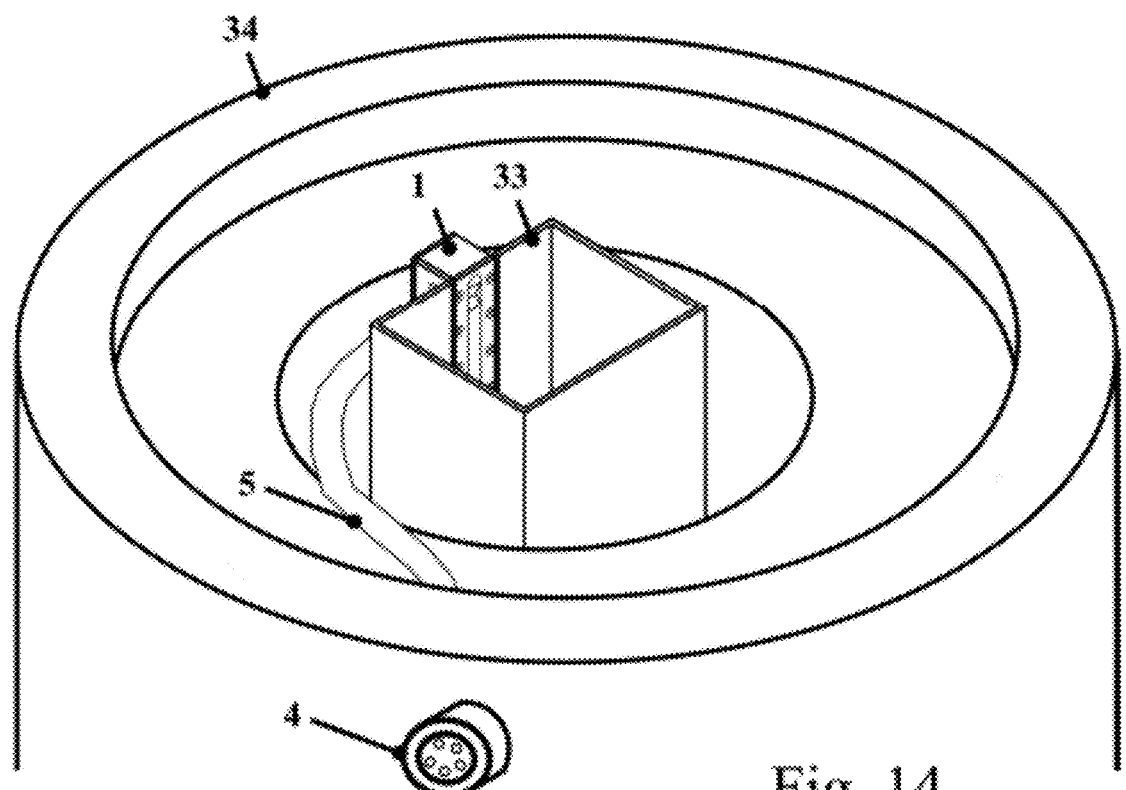
FIG. 14 schematically shows a perspective view of a part of a mould with the sensor according to the invention mounted.
Figure 15:
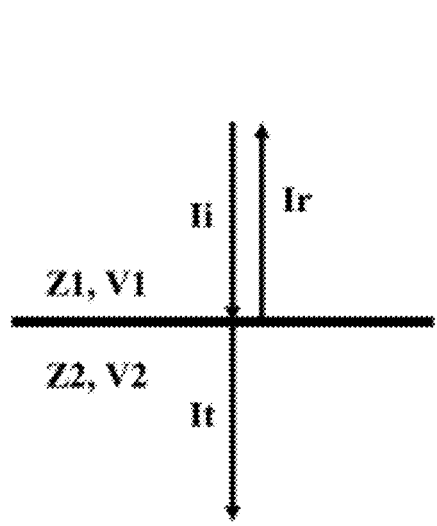
FIG. 15, FIG. 16, FIG. 17, FIG. 18, FIG. 19 schematically show the physical principles at the basis of the present invention.

With reference to a detection system (1) made in the form of a sensor containing on its inside all the elements necessary for the generation and the reception of the ultrasonic elastic waves (FIG. 1, FIG. 2, FIG. 3, FIG. 14), the sensor (1) can include a case (2), for example made of stainless steel, which is provided with fixing means (3) for facilitating its mounting in the measuring region. For example the fixing means (3) can be made in the form of a pair of fixing fins provided with holes for the passage of screws. For example (FIG. 14) the sensor (1) can be mounted on a conveyor (33) of a mould (34) and in particular the sensor (1) can be mounted in such a way as to replace a portion of the conveyor (33). By this solution it will be possible to have the sensor (1) (FIG. 4, FIG. 8, FIG. 9, FIG. 17, FIG. 18, FIG. 19) mounted in a condition of essential parallelism with respect to the crystallizer (35) within which the ultrasonic elastic waves have to be transmitted. In more detail the sensor (1) is spaced with respect to the crystallizer by a distance which is essentially equal to the spacing (36) that separates the conveyor (33) from the crystallizer (35), although, as explained above, it is also possible to provide solutions with greater or smaller distances, solutions of mounting in a condition of adhesion to the crystallizer and solutions of mounting within the volume of the crystallizer. The sensor (1) will be further provided with an outlet (11) for the passage of the electrical connections which will be contained in a cable (5) provided with a connector (4) at its end for the connection to the electronic devices of supply, signal pre-processing, communication with the processing and adjustment systems. The case (2) will include a detection face (6). In the case in which the case is made of a material not suitable for the efficient transmission of the ultrasonic elastic waves, the detection face (6), that is to say, the face of the sensor (1) through which the transmission and the reception of the ultrasonic elastic waves occur, is provided with a slot (7) or passage holes which are closed by a cover (8) made of a material suitable for the efficient transmission of the ultrasonic elastic waves. For example, one can resort to a plastic or polymeric material. In general, materials having an acoustic impedance of 3+/−2 MRayl are suitable. "MRayrl" is a unit of measurement of the acoustic impedance such that 1 MRayl is equal to 10 to the power of six kilograms over square metre per second. In the embodiment shown the detection face (6) consists of a closing plate (9) fixed to the case (2) by means of screws and the slot (7) or the passage holes for the application of the cover or covers (8) are obtained on said closing plate (9). However, it will be clear that other embodiments without the closing plate (9) or using fixing means other than the screws will also be possible. Inside the case (2) one thus obtains a hermetically sealed chamber (10) intended to house the ultrasonic elements (16, 20, 24, 28, 32) in addition to electronic components for controlling the latter, for example installed on one or more specific electronic cards. For example, for applications within a mould (34) in conditions of exposure to the flow of cooling fluid (44), it can be provided that the case (2) allows to obtain a sealing level for a pressure of at least 10 bars.

Preferably the case (2) has an elongated shape, with its major axis arranged parallel to the casting direction in such a way as to advantageously position a sufficient number of sensitive detection elements along the direction of interest for the measurement that has to be carried out. For example one can provide cases with a height of about 200 mm, in such a way as to allow the sensitive detection elements to be distributed in the region concerned by the level (39).

With reference to the embodiment in which the sensor (1) is mounted on the conveyor (33) and is spaced with respect to the crystallizer (35), the ultrasonic elastic waves cross said spacing (36) inasmuch as they are driven (FIG. 8, FIG. 9, FIG. 17, FIG. 18, FIG. 19) across the flow of cooling fluid (44) which circulates between the conveyor (33) and the crystallizer (35). Obviously, in case of installation in a condition of adhesion with the crystallizer or within the volume of the crystallizer there will be no phase of transmission of the ultrasonic elastic waves across the flow of cooing fluid (44). Once the ultrasonic elastic waves have reached the external wall (49) of the crystallizer (35) the ultrasonic elastic waves penetrate the crystallizer (35) and are reflected on the internal wall (48) of the crystallizer (35) itself then giving rise to a series of multiple reflections which propagate inside the thickness of the crystallizer. By internal wall (48) of the crystallizer one conventionally means the wall of the crystallizer which is in contact with the liquid metal, while by external wall (49) of the crystallizer one means the wall opposite to the internal wall (48) with reference to the thickness of the crystallizer. When from the inside of the crystallizer (35) the ultrasonic elastic waves reach the external wall (49) of the crystallizer (35) again there occurs:

a transmission through the external wall (49) of the crystallizer (35), with the generation of a first portion of transmitted ultrasonic elastic wave which crosses the crystallizer (35) to move again towards the sensor (1) or towards one of the ultrasonic elements (16, 20, 24, 28, 32) in the form of an ultrasound receiver a reflection, with the generation of a second portion of ultrasonic elastic wave which goes back towards the internal wall of the crystallizer (35).

As a consequence, the ultrasound receiver receives the ultrasonic elastic wave transmitted by the ultrasound transmitter after the ultrasonic elastic wave has crossed the thickness of the crystallizer (35) and optionally, if present with respect to the type of installation of the detection system, the spacing (36) between the conveyor (33) and the crystallizer (35).

The cover (8), as previously explained, is made of a material suitable for the efficient transmission of the ultrasonic elastic waves, such as a material having an acoustic impedance of 3+/−2 MRayl. The cover (8) consists of a body (12) machined (FIG. 3, FIG. 10, FIG. 11, FIG. 12, FIG. 13, FIG. 17, FIG. 18, FIG. 19) in such a way as to obtain on a first side (51) of the body (12) some insertion seats (13, 17, 21, 25, 29) for mounting corresponding ultrasonic elements (16, 20, 24, 28, 32). Each insertion seat (13, 17, 21, 25, 29) therefore comprises a corresponding support surface (14, 18, 22, 26, 30) on which the corresponding ultrasonic element (16, 20, 24, 28, 32) is adhered, preferably with the application of a pasty material which facilitates the acoustic coupling between the ultrasonic element (16, 20, 24, 28, 32) and the cover (8).

The support surface (14, 18, 22, 26, 30) of the at least one ultrasonic element (16, 20, 24, 28, 32) configured as an ultrasound transmitter is inclined by a first angle (B1) in such a way as to address the transmission wave (40) coming from the detection system or sensor (1) according to a direction of propagation which is inclined with respect to the surface which the transmission wave (40) must be incident, that is to say, with respect to the wall of the crystallizer in correspondence of which the penetration of the ultrasonic elastic waves must occur. This configuration is advantageous because in this way one prevents normal incidence phenomena (FIG. 15) on the crystallizer which would be characterised by a lower transmission of ultrasonic elastic waves inside the crystallizer (35) and by a greater reflection of ultrasonic elastic waves by the crystallizer (35). In this way one thus facilitates the penetration of the transmission wave (40) into the crystallizer (35) and one obtains a reflected wave (41) which is reflected on the internal wall (48) of the crystallizer (35) and which goes back towards the external wall (49) according to an inclined direction which in its turn also facilitates the crossing of a portion of said reflected wave to obtain a received wave (42) which can be effectively detected by the detection system or sensor (1). In order to facilitate the reception of the ultrasonic elastic waves after they have crossed the crystallizer (35) the support surface (14, 18, 22, 26, 30) of the at least one ultrasonic element (16, 20, 24, 28, 32) configured as an ultrasound receiver is inclined as well. However, the support surface (14, 18, 22, 26, 30) of the at least one ultrasonic element (16, 20, 24, 28, 32) configured as an ultrasound receiver is inclined by a second angle (B2) in such a way that the at least one ultrasonic element (16, 20, 24, 28, 32) configured as an ultrasound receiver is oriented with its sensitive surface essentially orthogonally with respect to the provided direction of propagation of the received waves (42) coming from the crystallizer (35), which will be inclined according to a direction of inclination which depends on the first angle (B1) according to which the transmission of the transmission wave (40) occurs.

The body (12) of the cover (8) is machined (FIG. 3, FIG. 10, FIG. 11, FIG. 12, FIG. 13, FIG. 17, FIG. 18, FIG. 19) also in correspondence of a second side (52) which is the opposite side with respect to the first side (51) of the body (12) on which the insertion seats (13, 17, 21, 25, 29) are obtained. On the second side (52) some crossing surfaces (15, 19, 23, 27, 31) of the ultrasonic elastic waves are obtained, which are parallel with respect to the corresponding support surfaces (14, 18, 22, 26, 30) obtained on the first side (51) of the body (12) of the cover (8). With reference to a first embodiment (FIG. 10, FIG. 11) of the cover (8), the body (12) of the cover (8) is machined in such a way as to obtain:
- on the first side (51) a first insertion seat (13) for a first ultrasonic element (16) which is an ultrasound transmitter wherein the first insertion seat (13) comprises a first support surface (14) inclined by a first angle (B1) with respect to the direction of longitudinal development of the body (12);
- on the second side (52) a first crossing surface (15) parallel to the first support surface (14) and placed in a condition of alignment with the first support surface (14) with respect to the direction of propagation of the ultrasonic elastic waves;
- on the first side (51) a second insertion seat (17) for a second ultrasonic element (20) which is an ultrasound receiver wherein the second insertion seat (17) comprises a second support surface (18) inclined by a second angle (B2) with respect to the direction of longitudinal development of the body (12);
- on the second seat (52) a second crossing surface (19) parallel to the second support surface (18) and placed in a condition of alignment with the second support surface (18) with respect to the direction of propagation of the ultrasonic elastic waves;
- on the first side (51) a third insertion seat (21) for a third ultrasonic element (24) which is an ultrasound receiver wherein the third insertion seat (21) comprises a third support surface (22) inclined by a second angle (B2) with respect to the direction of longitudinal development of the body (12);
- on the second side (52) a third crossing surface (23) parallel to the third support surface (22) and placed in a condition of alignment with the third support surface (22) with respect to the direction of propagation of the ultrasonic elastic waves.

With reference to a second embodiment (FIG. 12) of the cover (8), the body (12) of the cover (8) is machined in such a way as to also obtain, in addition to the elements previously described referring to the first embodiment (FIG. 10, FIG. 11) of the cover (8):
- on the first side (51) a fourth insertion seat (25) for a fourth ultrasonic element (28) which is an ultrasound receiver wherein the fourth insertion seat (25) comprises a fourth support surface (26) inclined by a second angle (B2) with respect to the direction of longitudinal development of the body (12);
- on the second side (52) a fourth crossing surface (27) parallel to the fourth support surface (26) and placed in a condition of alignment with the fourth support surface (26) with respect to the direction of propagation of the ultrasonic elastic waves.

With reference to a third embodiment (FIG. 13) of the cover (8), the body (12) of the cover (8) is machined in such a way as to also obtain, in addition to the elements previously described referring to the first embodiment (FIG. 10, FIG. 11) of the cover (8) and in addition to the elements previously described referring to the second embodiment (FIG. 12) of the cover (8):
- on the first side (51) a fifth insertion seat (29) for a fifth ultrasonic element (32) which is an ultrasound receiver wherein the fifth insertion seat (29) comprises a fifth support surface (30) inclined by a second angle (B2) with respect to the direction of longitudinal development of the body (12);
- on the second side (52) a fifth crossing surface (31) parallel to the fifth support surface (30) and placed in a condition of alignment with the fifth support surface (30) with respect to the direction of propagation of the ultrasonic elastic waves.

It will be clear that one can provide different solutions with respect to those represented with a greater number of transmitters and/or a greater number of receivers according to requirements. For example for the application of the present invention to obtain a thermal mapping of the mould one can provide solutions with a greater number of receivers. Solutions with transmitters operating at different frequencies combined with corresponding receivers, which in their turn are configured with the respective transmitters, are not excluded.

The ultrasonic elements (16, 20, 24, 28, 32) are mounted on the corresponding insertion seats (13, 17, 21, 25, 29) in such a way that their sensitive or transmission surface is in contact with and parallel to the respective support surfaces (14, 18, 22, 26, 30) of the insertion seats (13, 17, 21, 25, 29).

As far as the operation of the detection system or of the sensor (1) according to the invention is concerned, referring for illustrative simplicity to the embodiment (FIG. 8, FIG. 9, FIG. 17, FIG. 18, FIG. 19) with a sensor (1) installed on a conveyor (33) of a mould (34) in a moving away condition with respect to the crystallizer (35) by an amount corresponding to the spacing (36) for the flow of cooling fluid (44), the first ultrasonic element (16) is an ultrasound transmitter, the second ultrasonic element (20) is an ultrasound receiver, the third ultrasonic element (24) is an ultrasound receiver. The first ultrasonic element (16) is placed, with respect to the direction of the force of gravity (50), below the level (39) of the liquid metal (37) contained in the crystallizer (35). The first ultrasonic element (16) generates an ultrasonic pulse of the duration of 1 microsecond giving rise to the formation of a transmission wave (40) which propagates through (FIG. 17, FIG. 18, FIG. 19) the cover (8), in the layer of the flow of cooling fluid (44) present in the spacing (36) and in the crystallizer (35) and reaches the external wall (49) of the crystallizer (35). In general it can be provided that each of said pulses of transmission ultrasonic elastic waves (40) has a duration between 0.1 and 3 microseconds. Since the incidence of the transmission wave (40) is angled (FIG. 16), the incident ultrasonic elastic wave (Ii) is incident with an angle of incidence Ai in correspondence of the interface between:
- a first material having a first acoustic impedance value Z1 and having a first speed of propagation of the ultrasonic elastic waves V1;
- a second material having a second acoustic impedance value Z2 and having a second speed of propagation of the ultrasonic elastic waves V2.

Snell's law applies, by means of which it is possible to calculate the angle At according to which the transmitted ultrasonic elastic wave (It) propagates inside the second material knowing the first speed of propagation of the ultrasonic elastic waves V1, the second speed of propagation of the ultrasonic elastic waves V2 and the angle of incidence Ai, all said values being known.

$$\frac{\sin Ai}{V1} = \frac{\sin At}{V2} \quad (f1)$$

where the angles Ai and At are referred with respect to the line perpendicular to the interface between the two materials.

For example in the case in which the cover (8) is made of a polymeric material, the speed of the elastic waves can be of the order of 2500 m/s. For the present application one can provide for example the use of materials of the cover having speeds of propagation of the ultrasonic elastic waves included in the range from 1500 to 3500 m/s.

As to the intensity of the ultrasonic elastic waves, when the ultrasonic elastic waves undergo the transmission from the first material to the second material, it is possible to calculate the intensity of the transmitted ultrasonic waves as well. Remembering that, in addition to the transmitted ultrasonic elastic waves, there are also reflected supersonic waves, for which it applies (FIG. 16) that the angle of reflection Ar is equal to the angle of incidence Ai, the intensities Ii of the incident ultrasonic waves, It of the transmitted ultrasonic waves and Ir of the reflected ultrasonic waves are related by the following formulas:

$$\frac{I_r}{I_i} = \frac{(Z_2 - Z_1)^2}{(Z_2 + Z_1)^2} \quad (f2)$$

$$\frac{I_t}{I_i} = \frac{4Z_1 Z_2}{(Z_2 + Z_1)^2} \quad (f3)$$

$$\frac{I_r}{I_i} + \frac{I_t}{I_i} = 1 \quad (f4)$$

where the latter relation represents the law of conservation of energy.

It is also necessary to consider another aspect regarding the oscillation mode of elastic waves. Elastic waves can be longitudinal or transverse. If an ultrasonic elastic wave of the longitudinal type which propagates in a first material is incident at the interface with a second material with an angle of incidence Ai which is not zero, in the second material there will be the transmission both of longitudinal ultrasonic elastic waves and of transverse ultrasonic elastic waves, that is to say the incident longitudinal oscillation mode is partially converted into transverse oscillation mode. Considering the specific case of the measuring system or sensor (1) according to the invention, the first ultrasonic element (16) generates ultrasonic elastic waves of the longitudinal type. In case of presence of the spacing (36) with the flow of cooing fluid (44), since in liquids only the ultrasonic elastic waves of the longitudinal type propagate, the transmitted wave which is incident with respect to the crystallizer (35) is longitudinal. The wave transmitted in the crystallizer (35) is converted into a transverse-mode wave which then undergoes a series of following reflections inside the crystallizer (35), in this way (FIG. 8, FIG. 9, FIG. 17, FIG. 18, FIG. 19) the wave transmitted in the crystallizer (35) being a transverse-mode wave which moves inside the wall of the crystallizer (25) along a zigzag path defined by the following reflections; the transmitted wave is then converted again into a longitudinal-mode wave and transmitted again in the spacing (36) with the flow of cooling fluid (44) and finally crosses the cover to reach the second ultrasonic element (20).

Figure 16:
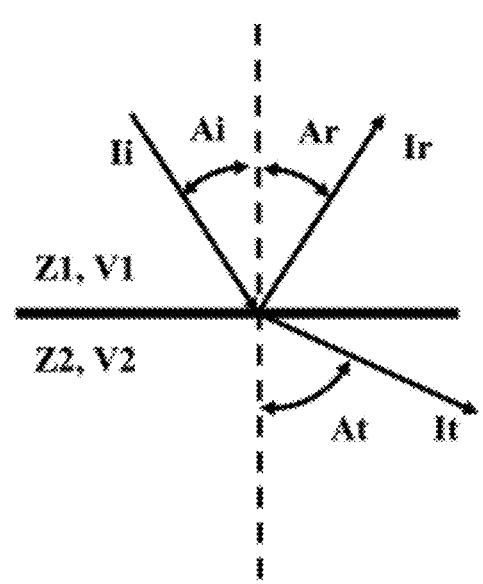

Therefore, when the transmission wave (40) reaches the external wall (49) of the crystallizer (35) it undergoes a deviation according to Snell's law (FIG. 16). Inside (FIG. 8) the crystallizer (35) the transmitted ultrasonic elastic wave (It) continues to propagate essentially rectilinearly until the transmitted ultrasonic elastic wave (It) reaches the internal wall (48) of the crystallizer (35). In this zone a reflection occurs according to a direction of reflection such that (FIG. 16) the angle of reflection (Ar) of the reflected ultrasonic elastic wave (Ir) is equal to the angle of incidence Ai of the incident ultrasonic elastic wave which, in our specific case, is the ultrasonic elastic wave previously transmitted (It) in correspondence of the coupling surface between the crystallizer (35) and the spacing (36) concerned by the presence of the flow of fluid (44).

At this point the phenomenon is repeated (FIG. 8, FIG. 9) giving rise to a series of multiple reflections inside the crystallizer (35) also with the presence of a series of multiple transmissions of ultrasonic elastic waves which are reflected towards the detection system or sensor (1) thus obtaining a series of received waves (42) which are picked up by the ultrasonic elements (20, 24, 28, 32) configured as ultrasound receivers.

In particular the second ultrasonic element (20), which is an ultrasound receiver, receives (FIG. 19) the ultrasonic elastic waves after a time equal to the sum of:
TP1: time of flight of the ultrasonic elastic waves in the cover (8);
TL1: time of flight of the ultrasonic elastic waves in the spacing (36) with the flow of cooling fluid (44), in the case in which the spacing (36) is present;

TC1: time of flight within the thickness of the crystallizer (35) of the transmitted ultrasonic elastic waves It1;

TC2: time of flight within the thickness of the crystallizer (35) of the reflected ultrasonic elastic waves Ir, which is equal to TC1;

TB: overall time of flight of the following reflections inside the thickness of the crystallizer (35) of the ultrasonic elastic waves, which is equal to the sum of the times of flight TCn of each reflection within that portion of crystallizer, TL2: time of flight of the ultrasonic elastic waves in the spacing (36) with the flow of cooling fluid (44), in the case in which the spacing (36) is present, which is equal to TL1;

TP2: time of flight of the ultrasonic elastic waves in the cover (8), which is equal to TP1.

In particular the third ultrasonic element (24), which is an ultrasound receiver, receives (FIG. 19) the ultrasonic elastic waves after a time equal to the sum of:

TP1: time of flight of the ultrasonic elastic waves in the cover (8);

TL1: time of flight of the ultrasonic elastic waves in the spacing (36) with the flow of cooling fluid (44), in the case in which the spacing (36) is present;

TC1: time of flight within the thickness of the crystallizer (35) of the transmitted ultrasonic elastic waves It1;

TC2: time of flight within the thickness of the crystallizer (35) of the reflected ultrasonic elastic waves Ir, which is equal to TC1;

TL3: time of flight of the ultrasonic elastic waves in the spacing (36) with the flow of cooling fluid (44), in the case in which the spacing (36) is present which is equal to TL1;

TP3: time of flight of the ultrasonic elastic waves in the cover (8), which is equal to TP1.

Since, as previously explained, the speed of propagation of sound depends on the temperature, which, in its turn depends on the position of the level (39) of the liquid metal contained in the crystallizer, the time TB depends on the position of the level (39) of the liquid metal contained in the crystallizer and it is therefore possible, by measuring it, to obtain a measurement of the position of the level (39).

Considering (FIG. 18, FIG. 19) the particular case with two ultrasound receivers, that is to say, with the second ultrasonic element (20) and the third ultrasonic element (24), one has that the third ultrasonic element (24) detects the ultrasonic pulse at the moment t1, after this has been reflected once inside the wall of the crystallizer (35);

the second ultrasonic element (20) detects the pulse at the moment t2, after this has been subject to a series of following reflections inside the wall of the crystallizer (35).

The measurement of the difference between the time of flight of the two sensors, Dt=t2−t1, is the time TB employed by the ultrasonic elastic waves to propagate in the mould portion between the two receivers, that is to say, between the third ultrasonic element (24) and the second ultrasonic element (20). The length of the path followed by the ultrasounds in the wall of the mould remains constant, therefore the time Dt is inversely proportional to the speed of propagation of the ultrasonic elastic waves in the material of the crystallizer (35), generally of copper. The speed in the material of the crystallizer (35) is linked to the average temperature in the corresponding portion of the crystallizer (35), which in its turn depends on the position of the level (39).

Figure 20:
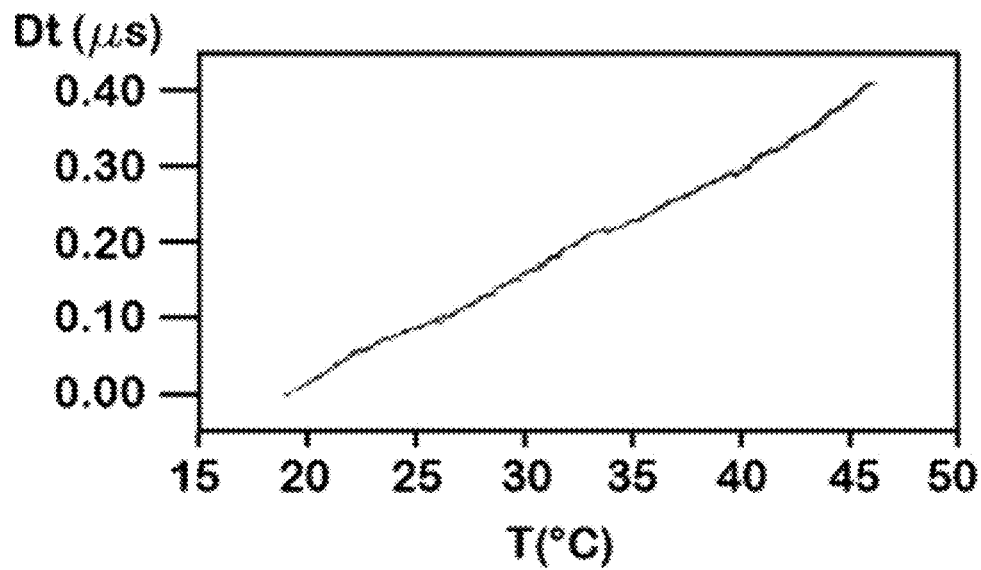
FIG. 20 shows a curve which illustrates the response of a sensor according to the invention with respect to the temperature variations in a crystallizer.

Dedicated research and experiments have shown that there is a linear correlation (FIG. 20) between the time difference Dt and the temperature of the corresponding portion of crystallizer (35), that is to say, the position of the level of the liquid metal.

Although it is possible to obtain a measurement also with only one receiver, it is, therefore, advantageous to use two receivers because one automatically eliminates the influence of other factors, such as the temperature of the flow of fluid (44), the temperature of the cover (8).

By using a greater number of receivers it is possible to calculate a temperature profile along the wall of the crystallizer. This is advantageous:

both for the application as a level indicator as, having the mapping of the temperature, it is possible to determine the position of the level (39) without it being necessary to carry out sensor setting procedures;

and for the application of monitoring of the temperature of the crystallizer to prevent phenomena of skin breakout and of sticking of the liquid metal to the walls of the crystallizer.

Following experimental tests it has also been possible to find some optimal values for the first angle (B1) according to which the ultrasound transmitter is inclined, which coincides with the angle of incidence Ai of the transmitted ultrasonic elastic wave. Said first angle (B1) is preferably between 15 and 35 degrees, even more preferably between 20 and 30 degrees. Excellent results have been obtained with values of the first angle (B1) approximately of 25 degrees. The second angle (B2) according to which the ultrasound receivers are inclined is preferably equal to the first angle (B1).

To conclude, the present invention relates to (FIG. 8, FIG. 9, FIG. 17, FIG. 18, FIG. 19) a measuring method of at least one physical quantity selected from:

temperature of at least one portion of a crystallizer (35) of a mould (34) of a continuous casting machine of a liquid metal (37);

position of the meniscus or level (39) of the liquid metal (37) within the crystallizer (35);

wherein the method includes a phase of transmission of at least one detection signal transmitted towards the crystallizer (35), a phase of reception of at least one received measuring signal dependent on the transmitted detection signal, a measuring phase carried out on the basis of the at least one received measuring signal wherein the phase of transmission of the at least one detection signal is a phase of transmission of at least one transmission ultrasonic elastic wave (40) by means of (FIG. 8, FIG. 9, FIG. 17, FIG. 18, FIG. 19) at least one first ultrasonic element (16) configured as an ultrasound transmitter, the phase of transmission occurring according to a transmission direction oriented towards a wall of the crystallizer (35) containing the liquid metal (37). The phase of reception of the at least one received measuring signal comprises (FIG. 8, FIG. 9, FIG. 17, FIG. 18, FIG. 19) at least one first phase of reception of a received ultrasonic elastic wave (42) by means of at least one second ultrasonic element (20) configured as an ultrasound receiver arranged in a spaced position with respect to the position of the first ultrasonic element (16), said received ultrasonic elastic wave (42) consisting of a portion of the transmission ultrasonic elastic wave (40) which has penetrated and has been transmitted within the wall of the crystallizer (35) in the form of a transverse-mode body wave and has been reflected towards the second ultrasonic element (20).

The measuring phase can comprise a measuring phase for measuring the time elapsed between the phase of transmission of the at least one detection signal and the phase of reception of the at least one received measuring signal.

The direction of transmission of the at least one transmission ultrasonic elastic wave (40) is preferably inclined according to an angle of incidence Ai with respect to the wall of the crystallizer (35). The angle of incidence Ai can be between 15 and 35 degrees, preferably between 20 and 30 degrees, even more preferably approximately of 25 degrees.

The phase of transmission of the transmission ultrasonic elastic wave (40) can be a phase of transmission of a series of pulses of transmission ultrasonic elastic waves (40), each of the pulses of transmission ultrasonic elastic waves (40) having a duration between 0.1 and 3 microseconds.

The second ultrasonic element (20) is arranged (FIG. 8, FIG. 9, FIG. 17, FIG. 18, FIG. 19) in a spaced position with respect to the position of the first ultrasonic element (16) according to an essentially parallel direction with respect to the longitudinal development of the wall of the crystallizer (35).

In the method according to the invention it can be provided that the phase of reception of the at least one received measuring signal comprises:
a first phase of reception of the received ultrasonic elastic wave (42) by means of the second ultrasonic element (20) configured as an ultrasound receiver;
at least one second phase of reception of the received ultrasonic elastic wave (42) by means of a third ultrasonic element (24) configured as an ultrasound receiver;
wherein the third ultrasonic element (24) is placed between the first ultrasonic element (16) and the second ultrasonic element (20).

In this case the measuring phase can comprise (FIG. 19):
a measuring phase for measuring a first time of flight corresponding to the time elapsed between the phase of transmission of the at least one detection signal by the first ultrasonic element (16) and the phase of reception of the at least one measuring signal received by the second ultrasonic element (20);
a measuring phase for measuring a second time of flight corresponding to the time elapsed between the phase of transmission of the at least one detection signal by the first ultrasonic element (16) and the phase of reception of the at least one measuring signal received by the third ultrasonic element (24);
a phase of calculation of the difference between the first time of flight and the second time of flight.

The method according to the invention can be configured alternatively or also in combination as a measuring method for measuring the position of the meniscus or level (39) of the liquid metal (37) within the crystallizer (35) or as a measuring method for measuring the temperature of at least one portion of the crystallizer (35) of the mould (34) of a continuous casting machine.

In the case of the method according to the invention configured as a measuring method for measuring the position of the meniscus or level (39) of the liquid metal (37) within the crystallizer (35), the measurement of the position of the meniscus or level (39) of the liquid metal (37) within the crystallizer (35) will be obtained by means of a comparison between the received ultrasonic elastic wave (42) received by means of the second ultrasonic element (20) and the received ultrasonic elastic wave (42) received by means of a third ultrasonic element (24).

In the method according to the invention it can be provided that the phase of reception of the at least one received measuring signal comprises:
a first phase of reception of the received ultrasonic elastic wave (42) by means of the second ultrasonic element (20) configured as an ultrasound receiver
at least one second phase of reception of the received ultrasonic elastic wave (42) by means of the third ultrasonic element (24) configured as an ultrasound receiver,
one or more further third phases of reception of the received ultrasonic elastic wave (42) by means of further ultrasonic elements (28, 32) configured as ultrasound receivers;
wherein the third ultrasonic element (24) is placed between the first ultrasonic element (16) and the second ultrasonic element (20) and wherein the further ultrasonic elements (28, 32) are placed between the third ultrasonic element (24) and the second ultrasonic element (20).

In this case the measuring phase can comprise (FIG. 19):
a measuring phase for measuring the first time of flight corresponding to the time elapsed between the phase of transmission of the at least one detection signal by the first ultrasonic element (16) and the phase of reception of the at least one received measuring signal by the second ultrasonic element (20);
a measuring phase for measuring the second time of flight corresponding to the time elapsed between the phase of transmission of the at least one detection signal by the first ultrasonic element (16) and the phase of reception of the at least one received measuring signal by the third ultrasonic element (24);
further third measuring phases for measuring further third times of flight each corresponding to the time elapsed between the phase of transmission of the at least one detection signal by the first ultrasonic element (16) and the corresponding third phase of reception of the at least one received measuring signal by each of the further ultrasonic elements (28, 32).

In the case of the method according to the invention configured as a measuring method for measuring the temperature of several portions of the crystallizer (35) arranged along the wall of the crystallizer (35), the measurement of the temperature in each portion of the crystallizer (35) can be obtained by means of a comparison between the received ultrasonic elastic wave (42) received by means of the third ultrasonic element (24) and the received ultrasonic elastic wave (42) received by means of one between the second ultrasonic element (20) and the further ultrasonic elements (28, 32), each of said second ultrasonic element (20) and further ultrasonic elements (28, 32) detecting the temperature of a corresponding portion of crystallizer (35) approximately located frontally in the area between the ultrasonic elements.

The present invention also relates to (FIG. 1, FIG. 2, FIG. 3, FIG. 4, FIG. 5, FIG. 6, FIG. 7, FIG. 8, FIG. 9, FIG. 14) a detection system (1) for detecting at least one physical quantity selected from:
temperature of at least one portion of a crystallizer (35) of a mould (34) of a continuous casting machine of a liquid metal (37);
position of the meniscus or level (39) of the liquid metal (37) within the crystallizer (35);
wherein the detection system (1) comprises at least one transmitter of a detection signal transmitted towards the crystallizer (35) and at least one receiver of at least one received measuring signal dependent on the transmitted detection signal and wherein the transmitter is at least one first ultrasonic element (16) configured as a transmitter of a transmission ultrasonic elastic wave (40) and the receiver is at least one second ultrasonic element (20) configured as a receiver of a received ultrasonic elastic wave (42). The first ultrasonic element (16) is oriented according to a direction of transmission towards a wall of the crystallizer (35) containing the liquid metal (37). The second ultrasonic element (20) is oriented in such a way as to receive at least one portion of the transmission ultrasonic elastic wave (40) which has penetrated and has been transmitted within the wall of the crystallizer (35) in the form of a transverse-mode body wave and has been reflected towards the second ultrasonic element (20).

The first ultrasonic element (16) is oriented according to a direction of transmission such that the at least one transmission ultrasonic elastic wave (40) is inclined according to an angle of incidence Ai with respect to the wall of the crystallizer (35). Preferably the angle of incidence Ai is between 15 and 35 degrees, even more preferably the angle of incidence Ai is between 20 and 30 degrees, preferably approximately of 25 degrees.

In one embodiment the first ultrasonic element (16) can be configured and structured in such a way as to transmit a series of pulses of transmission ultrasonic elastic waves (40) in which each of the pulses of transmission ultrasonic elastic waves (40) has a duration between 0.1 and 3 microseconds.

The ultrasonic elements (16, 20) are located in correspondence of a same side of the mould (34) in such a way that the second ultrasonic element (20) is arranged (FIG. 1, FIG. 2, FIG. 3, FIG. 4, FIG. 5, FIG. 6, FIG. 7, FIG. 8, FIG. 9, FIG. 14) in a spaced position with respect to the position of the first ultrasonic element (16) according to an essentially parallel direction with respect to the longitudinal development of the wall of the crystallizer (35).

The detection system (1) can further comprise a third ultrasonic element (24) placed between the first ultrasonic element (16) and the second ultrasonic element (20).

The detection system (1) can further comprise a series of one or more further ultrasonic elements (28, 32) configured as ultrasound receivers wherein the third ultrasonic element (24) is placed between the first ultrasonic element (16) and the second ultrasonic element (20) and wherein the further ultrasonic elements (28, 32) are placed between the third ultrasonic element (24) and the second ultrasonic element (20).

The detection system (1) according to the invention can be configured and structured according to an arrangement in which (FIG. 7) the ultrasonic elements (16, 20, 24, 28, 32) are placed within a housing (43) obtained within the thickness of said crystallizer (35).

The detection system (1) according to the invention can be configured and structured according to an arrangement in which (FIG. 6) the ultrasonic elements (16, 20, 24, 28, 32) are placed in a condition of adhesion with the wall of the crystallizer (35) which is an external wall (49) of the crystallizer (35) opposite with respect to an internal wall (48) of the crystallizer (35) which is in contact with the liquid metal (37).

The detection system (1) according to the invention can be configured and structured according to an arrangement in which (FIG. 1, FIG. 2, FIG. 3, FIG. 8, FIG. 9) the ultrasonic elements (16, 20, 24, 28, 32) are placed within a hermetically sealed case (2) constituting a sensor body (1) provided with fixing means (3) for fixing to the (FIG. 14) mould (34). The case (2) constituting the sensor body (1) comprises one or more slots or holes (7) in correspondence of a detection face (6) which is the face of the sensor (1) through which the transmission and the reception of the ultrasonic elastic waves occur. The one or more slots or holes (7) are closed by means of one or more covers (8) made of a material suitable for the efficient transmission of the ultrasonic elastic waves, for example of a plastic or polymeric material or of a material having an acoustic impedance of 3+/−2 MRayl.

Preferably each of the one or more covers (8) comprises at least one machined insertion seat (13, 17, 21, 25, 29) which is configured for the insertion of one of the ultrasonic elements (16, 20, 24, 28, 32).

Each of the one or more covers (8) can comprise (FIG. 10, FIG. 11, FIG. 12, FIG. 13):
  on a first side (51) facing the inside of the case (2) the machined insertion seat (13, 17, 21, 25, 29), said insertion seat (13, 17, 21, 25, 29) comprising an inclined support surface (14, 18, 22, 26, 30);
  on a second side (52) opposite with respect to the first side (51) a crossing surface (15, 19, 23, 27, 31) parallel to the support surface (14, 18, 22, 26, 30) and placed in a condition of alignment with the support surface (14, 18, 22, 26, 30) with respect to the direction of propagation of the ultrasonic elastic waves.

The support surface (14) of the first ultrasonic element (16) configured as a transmitter is inclined according to an inclination direction which is opposite with respect to the inclination direction of the support surface (18, 22, 26, 30) of the at least one second ultrasonic element (20).

The present invention also relates to a mould (34) for the production of steelwork semi-finished products by casting a liquid metal (37) within a crystallizer (35) of the mould (34) wherein the mould (34) comprises a detection system (1) as previously described which can be indifferently made:
  in the form (FIG. 7) of ultrasonic elements inserted in the crystallizer
  in the form (FIG. 6) of ultrasonic elements which are in contact with the external wall of the crystallizer,
  in the form (FIG. 4, FIG. 5) of ultrasonic elements inserted in a sensor body (FIG. 1, FIG. 2, FIG. 3) mounted on the mould.

The present invention also relates to a continuous casting machine for the production of steelwork semi-finished products by casting a liquid metal (37) within a crystallizer (35) of a mould (34) wherein the continuous casting machine comprises at least one detection system (1) as previously described which can be indifferently made:
  in the form (FIG. 7) of ultrasonic elements inserted in the crystallizer;
  in the form (FIG. 6) of ultrasonic elements which are in contact with the external wall of the crystallizer;
  in the form (FIG. 4, FIG. 5) of ultrasonic elements inserted in a sensor body (FIG. 1, FIG. 2, FIG. 3) mounted on the mould.

Thus, the present invention relates to a mould (34) for the production of steelwork semi-finished products by casting a liquid metal (37) within a crystallizer (35) of the mould (34) in which the mould includes a detection system (1) provided with calculation and measuring means for detecting a position of a meniscus or level (39) of said liquid metal (37) within said crystallizer (35).

The detection system (1) comprises at least one transmitter of a detection signal transmitted towards said crystallizer (35) and at least one receiver of at least one received measuring signal dependent on said transmitted detection signal. The transmitter is at least one first ultrasonic element (16) configured as a transmitter of a transmission ultrasonic elastic wave (40) and the receiver is at least one second ultrasonic element (20) configured as a receiver of a received ultrasonic elastic wave (42). The first ultrasonic element (16) is oriented according to a direction of transmission towards a wall of said crystallizer (35) containing said liquid metal (37). In detail the first ultrasonic element (16) is oriented according to a direction of transmission such that said at least one transmission ultrasonic elastic wave (40) is inclined according to an angle of incidence Ai with respect to said wall of the crystallizer (35)

The ultrasonic elements (16, 20) are located in correspondence of a same side of the mould (34) in such a way that the second ultrasonic element (20) is placed in a spaced position with respect to the position of the first ultrasonic element (16) according to a direction essentially parallel with respect to the longitudinal development of the wall of the crystallizer (35).

The second ultrasonic element (20) is oriented in such a way as to receive at least one portion of said transmission ultrasonic elastic wave (40) which has penetrated and has been transmitted within said wall of said crystallizer (35) in the form of a transverse-mode body wave transmitted in the crystallizer (35) moving inside the wall of the crystallizer (25) along a zigzag path defined by the following reflections, said second ultrasonic element (20) being configured and structured to receive the reflected wave of said transverse-mode body wave transmitted in the crystallizer (35).

The measuring means of the detection system (1) are configured to measure the time elapsed between said phase of transmission of said at least one detection signal and said phase of reception of said at least one received measuring signal, the time elapsed between said phase of transmission and said phase of reception corresponding to a time interval required for the ultrasonic body waves to travel across the crystallizer between the first ultrasonic element (16) and the second ultrasonic element (20).

For example the elapsed time is in relation with the temperature of the crystallizer according to a relation in which the elapsed time is proportional to (distance of the path of the transverse-mode body wave)/(Speed of the transverse-mode body wave in the crystallizer), the speed of the transverse-mode body wave in the crystallizer being dependent on the temperature of the crystallizer which in turn depends on the position of the level.

The calculation means of the detection system (1) are configured to calculate the position of the meniscus or level (39) of said liquid metal (37) within the crystallizer (35) by means of a correlation relation between the position of a meniscus or level (39) within the crystallizer (35) and the time elapsed between said phase of transmission and said phase of reception in which the time elapsed between said phase of transmission and said phase of reception depends on the temperature of the crystallizer between the first ultrasonic element (16) and the second ultrasonic element (20).

Preferably the detection system (1) further includes at least one third ultrasonic element (24) placed between said first ultrasonic element (16) and said second ultrasonic element (20) in which the at least one third ultrasonic element (24) is configured as a receiver.

The calculation means of the detection system (1) are configured to determine the position of the meniscus or level (39) by means of a calculation of a maximum value of a fitting function in which the fitting function represents the temperature profile of the crystallizer (35) as a function of the position along the direction essentially parallel with respect to the longitudinal development of the wall of the crystallizer (35), the calculation means being configured to calculate the fitting function from calculation points of the temperature in different positions measured by means of said second ultrasonic element (20) and said at least one third ultrasonic element (24) in which each calculation point is calculated as a proportional function of a difference between:

the time elapsed between the phase of transmission and the phase of reception of the second ultrasonic element (20)

and the time elapsed between the phase of transmission and the phase of reception of the at least one third ultrasonic element (24).

Even more preferably the detection system (1) further includes a series of one or more further ultrasonic elements (28, 32) configured as ultrasound receivers wherein said third ultrasonic element (24) is placed between said first ultrasonic element (16) and said second ultrasonic element (20) and wherein said further ultrasonic elements (28, 32) are placed between said third ultrasonic element (24) and said second ultrasonic element (20), each of said further ultrasonic elements (28, 32), the calculation means being configured to calculate further calculation points of the temperature in different positions measured by means of said further ultrasonic elements (28, 32).

For example the calculation of the temperature can be made according to a formula in which:

$$\text{Temperature in point } (i) \text{ of the crystallizer} = [(0.5 \times Dt \times A/Dl) - B]/C$$

In which:
Dt is the difference of receiving time of two different receivers which are positioned one above and one below the measuring point (i)
Dl is the path of the waves in the crystallizer between the two different receivers
A, B, C are parameters which depend on the specific characteristics of the crystallizer and of the mould as for example thickness, material, shape. These parameters are constants that can be determined according to empiric measures of calibration of the system Once the temperatures are calculated in different points (i) of the crystallizer, in which each point corresponds to a receiver, the temperature profile along the crystallizer is calculated as a fitting curve starting from the calculated temperatures in the different points (i) of the crystallizer, thus obtaining a Temperature function which provides the temperature depending on a variable (z) corresponding to a coordinate along the direction essentially parallel with respect to the longitudinal development of the wall of the crystallizer (35).

Evaluating the maximum of temperature of the fitting curve, the position of the level (that is the coordinate z corresponding to the position of the meniscus or level (39) within the crystallizer) is then determined so that the control system of the casting machine can regulate the level in the mould accordingly.

The description of the present invention has been made with reference to the enclosed figures in a preferred embodiment, but it is evident that many possible changes, modifications and variations will be immediately clear to those skilled in the art in the light of the previous description. Thus, it must be underlined that the invention is not limited to the previous description, but it includes all the changes, modifications and variations in accordance with the appended claims.

NOMENCLATURE USED

With reference to the identification numbers in the enclosed figures, the following nomenclature has been used:

1. Sensor or detection system
2. Case
3. Fixing means
4. Connector
5. Cable
6. Detection face
7. Slot or holes
8. Cover
9. Closing plate
10. Chamber
11. Outlet
12. Body
13. First seat
14. First support surface
15. First crossing surface
16. First ultrasonic element
17. Second seat
18. Second support surface
19. Second crossing surface
20. Second ultrasonic element
21. Third seat
22. Third support surface
23. Third crossing surface
24. Third ultrasonic element
25. Fourth seat
26. Fourth support surface
27. Fourth crossing surface
28. Fourth ultrasonic element
29. Fifth seat
30. Fifth support surface
31. Fifth crossing surface
32. Fifth ultrasonic element
33. Conveyor
34. Mould
35. Crystallizer
36. Spacing
37. Liquid metal
38. Skin
39. Level
40. Transmission wave
41. Reflected wave
42. Received wave
43. Housing
44. Water flow
45. Metal flow
46. Upper end
47. Lower end
48. Internal wall
49. External wall
50. Direction of the force of gravity
Ai. Angle of incidence
At. Angle of transmission
Ar. Angle of reflection
B1. First angle of inclination
B2. Second angle of inclination

The invention claimed is:

1. A system for detection of a level of a liquid metal during production of a semi-finished steelwork product by casting the liquid metal, the system comprising:
a mold having a crystallizer, said mold adapted to receive the liquid metal;
a detection system cooperative with said mold, said detection system adapted to detect a position of a meniscus or a level of the liquid metal within the crystallizer, said detection system comprising:
at least one transmitter that transmits a detection signal, said at least one transmitter being a first ultrasonic element that transmits an ultrasonic elastic wave toward a wall of the crystallizer; and
at least one receiver that receives a measuring signal, the measuring signal being dependent on the detection signal, said at least one receiver being a second ultrasonic element that receives the transmitted ultrasonic elastic wave, the first ultrasonic element being oriented toward a wall of the crystallizer, the first ultrasonic element being oriented such that the transmitted ultrasonic elastic wave is inclined at an angle of incidence with respect to the wall of the crystallizer, the first and second ultrasonic elements being arranged on a common side of said mold such that the second ultrasonic element is in spaced relation relative to the first ultrasonic element in a direction generally parallel to the wall of the crystallizer, wherein the second ultrasonic element is oriented so as to receive at least one portion of the transmitted ultrasonic elastic wave which through penetrates through the wall of the crystallizer and passes, into the crystallizer, the at least a portion of the transmitted ultrasonic elastic wave being a transverse body wave moving along a zigzag path defined by reflections, the second ultrasonic element receiving a reflection of the transverse body wave, wherein said detection system that measures a time that has elapsed between the transmission of the detection signal and the reception of the measuring signal, the time that has elapsed corresponding to a time interval required for the transverse body wave to travel across the crystallizer between the first ultrasonic element and the second ultrasonic element, wherein said detection system calculates the position of the meniscus or the level of the liquid metal in the crystallizer by correlating the position of the level of the meniscus or the liquid metal within the crystallizer and the time that has elapsed and a temperature of the crystallizer between the first ultrasonic element and the second ultrasonic element.

2. The system of claim 1, further comprising:
a third ultrasonic element positioned between the first ultrasonic element and the second ultrasonic element, said third ultrasonic element being, a receiver.

3. The system of claim 2, wherein said detection system determines the position of the meniscus or level of the liquid metal by calculating a maximum value of a fitting function, the fitting function corresponding to a temperature profile of the crystallizer as a function of the position of the first ultrasonic element and the second ultrasonic element along the direction parallel to the wall of the crystallizer, said detection system calculating the fitting function from calculation, points of the temperature in different positions as measured by the second ultrasonic element and the third ultrasonic element, each of the calculation points being a function of a difference between an elapsed time between the transmission by the first ultrasonic element and the reception by the second ultrasonic element and the time elapsed between the transmission by said first ultrasonic element and the reception by the third ultrasonic element.

4. The system of claim 3, further comprising:
at least one additional ultrasonic element that is another ultrasonic receiver, wherein said at least one additional ultrasonic element is positioned between the third ultrasonic element and the second ultrasonic element.

5. The system of claim 1, wherein the angle of incidence is between 15 and 35 degrees.

6. The system of claim 5, wherein the angle of incidence is between 20 and 30 degrees.

7. The system of claim 1, wherein the transmitted ultrasonic elastic wave has a frequency of between 1 and 10 MHz.

8. The system of claim 7, wherein the transmitted ultrasonic elastic wave has a frequency of between 1.5 and 5 MHz.

9. The system of claim 1 wherein the first ultrasonic element transmits a series of pulses of ultrasonic elastic waves.

10. The system of claim 9, wherein each of the series of pulses has a duration of between 0.1 and 3 microseconds.

11. The system of claim 1, wherein the first ultrasonic element and the second ultrasonic element are positioned within a hermetically sealed case that, is affixed to said mold.

12. The system of claim 11, wherein the hermetically sealed case has at least one slot or hole in which the transmission or the reception of the ultrasonic elastic waves occurs.

13. The system of claim 12, the at least one slot or hole being covered by a material that allows the ultrasonic elastic waves to be transmitted therethrough.

14. The system of claim 13, wherein the material is a polymeric material.

15. The system of claim 13, wherein the material has an acoustic impedance of between 1 and 5 MRayl.

16. The system of claim 13, wherein the at least one, slot or hole has a machined insert seat that allows for insertion of at least one of the first ultrasonic element and the second ultrasonic element.

17. The system of claim 16, wherein the machined insert seat has an inclined support surface on a first side facing an inside of the case, the case having a crossing surface parallel to the inclined support surface on a second side opposite to the first side, the crossing surface being aligned with the inclined support in a direction of a propagation of the ultrasonic elastic waves.

18. The system of claim 17, wherein the first ultrasonic element has a support surface that is inclined in a direction of the inclination that is opposite to a direction of inclination of a support surface of the second ultrasonic element.

19. A continuous casting machine having the system of claim 1.

* * * * *